(12) United States Patent
Yamada et al.

(10) Patent No.: US 10,670,282 B2
(45) Date of Patent: Jun. 2, 2020

(54) AIR CONDITIONING APPARATUS

(71) Applicant: DAIKIN INDUSTRIES, LTD., Osaka-shi, Osaka (JP)

(72) Inventors: Takuro Yamada, Osaka (JP); Masahiro Honda, Osaka (JP); Yuusuke Nakagawa, Osaka (JP); Yuusuke Oka, Osaka (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 0 days.

(21) Appl. No.: 16/337,825

(22) PCT Filed: Sep. 26, 2017

(86) PCT No.: PCT/JP2017/034733
§ 371 (c)(1),
(2) Date: Mar. 28, 2019

(87) PCT Pub. No.: WO2018/062177
PCT Pub. Date: Apr. 5, 2018

(65) Prior Publication Data
US 2019/0338986 A1 Nov. 7, 2019

(30) Foreign Application Priority Data
Sep. 30, 2016 (JP) ................................. 2016-192559

(51) Int. Cl.
*F25B 41/06* (2006.01)
*F24F 3/052* (2006.01)
*F25B 13/00* (2006.01)

(52) U.S. Cl.
CPC .......... *F24F 3/0525* (2013.01); *F25B 41/062* (2013.01); *F25B 13/00* (2013.01); *F25B 2600/2513* (2013.01)

(58) Field of Classification Search
CPC ... F25B 2600/2513; F25B 13/00; F25B 41/62
See application file for complete search history.

(56) References Cited

U.S. PATENT DOCUMENTS

2016/0097568 A1 4/2016 Korenaga
2016/0146496 A1 5/2016 Yamashita
(Continued)

FOREIGN PATENT DOCUMENTS

JP   H02-133744 A   5/1990
JP   2002-243312 A   8/2002
(Continued)

OTHER PUBLICATIONS

International Search Report for PCT/JP2017/034733 (PCT/ISA/210) dated Nov. 28, 2017.

*Primary Examiner* — David J Teitelbaum
(74) *Attorney, Agent, or Firm* — Birch, Stewart, Kolasch & Birch, LLP

(57) ABSTRACT

To reduce noise coming from an indoor unit in an air conditioning apparatus that has an outdoor unit that has a compressor and an outdoor heat exchanger, the indoor unit that has an indoor heat exchanger, and a liquid refrigerant connection pipe and a gas refrigerant connection pipe that interconnect both units and in which a liquid pressure adjusting expansion valve that reduces a pressure of a refrigerant flowing through the liquid refrigerant connection pipe in such a way that the refrigerant is in a gas-liquid two-phase state is provided in an outdoor liquid refrigerant pipe that interconnects the liquid-side end of the outdoor heat exchanger and the liquid refrigerant connection pipe. An external expansion valve unit having an external expansion valve that further reduces the pressure of the refrigerant whose pressure has been reduced in the liquid pressure adjusting expansion valve is provided in the outdoor liquid refrigerant pipe.

19 Claims, 17 Drawing Sheets

(56) References Cited

U.S. PATENT DOCUMENTS

2017/0097177 A1* 4/2017 Azuma ................... F24F 11/89
2018/0252443 A1* 9/2018 Naito .................... F25B 41/062

FOREIGN PATENT DOCUMENTS

| | | |
|---|---|---|
| JP | 2010-019472 A | 1/2010 |
| JP | 2010-169309 A | 8/2010 |
| JP | 2010-230288 A | 10/2010 |
| JP | 2012-215368 A | 11/2012 |
| JP | 2016-075402 A | 5/2016 |
| WO | WO 2015/029160 A1 | 3/2015 |

* cited by examiner

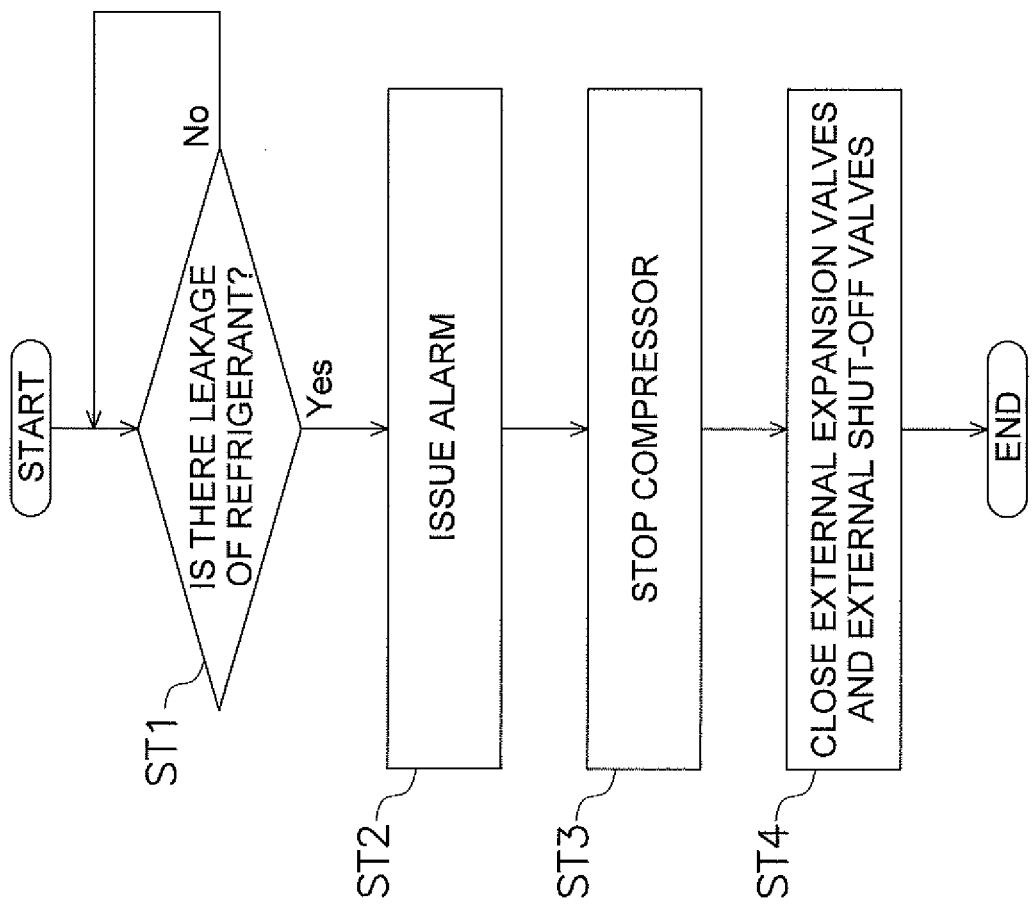

AIR CONDITIONING APPARATUS

TECHNICAL FIELD

The present invention relates to an air conditioning apparatus, and particularly an air conditioning apparatus that has an outdoor unit that has a compressor and an outdoor heat exchanger, an indoor unit that has an indoor heat exchanger, and a liquid refrigerant connection pipe and a gas refrigerant connection pipe that interconnect both units and in which a liquid pressure adjusting expansion valve that reduces the pressure of refrigerant flowing through the liquid refrigerant connection pipe in such a way that the refrigerant is in a gas-liquid two-phase state is provided in an outdoor liquid refrigerant pipe that interconnects the liquid-side end of the outdoor heat exchanger and the liquid refrigerant connection pipe.

BACKGROUND ART

Conventionally, there is an air conditioning apparatus that has an outdoor unit that has a compressor and an outdoor heat exchanger, an indoor unit that has an indoor heat exchanger, and a liquid refrigerant connection pipe and a gas refrigerant connection pipe that interconnect the outdoor unit and the indoor unit, and which performs an operation in which refrigerant circulates in the order of the compressor, the outdoor heat exchanger, the liquid refrigerant connection pipe, the indoor heat exchanger, the gas refrigerant connection pipe, and the compressor. Additionally, as such an air conditioning apparatus, there is, as described in patent document 1 (International Publication No. 2015/029160), an air conditioning apparatus where a liquid pressure adjusting expansion valve that reduces the pressure of the refrigerant flowing through the liquid refrigerant connection pipe in such a way that the refrigerant is in a gas-liquid two-phase state is provided in an outdoor liquid refrigerant pipe that interconnects the outdoor heat exchanger and the liquid refrigerant connection pipe. That is, in this air conditioning apparatus, when performing the operation in which the refrigerant circulates in the order of the compressor, the outdoor heat exchanger, the liquid refrigerant connection pipe, the indoor heat exchanger, the gas refrigerant connection pipe, and the compressor, two-phase conveyance of the refrigerant, in which the refrigerant in the gas-liquid two-phase state is made to flow into the liquid refrigerant connection pipe and is sent from the outdoor unit side to the indoor unit side, is configured to be performed by the pressure reduction in the liquid pressure adjusting expansion valve.

SUMMARY OF INVENTION

In the air conditioning apparatus of patent document 1, the refrigerant that has been reduced in pressure in such a way as to be in the gas-liquid two-phase state by the liquid pressure adjusting expansion valve in the outdoor unit is sent through the liquid refrigerant connection pipe to the indoor unit and is reduced in pressure to a low pressure by an indoor expansion valve in the indoor unit. At this time, the refrigerant in the gas-liquid two-phase state flows into the indoor expansion valve, so the refrigerant passing sound in the indoor expansion valve becomes greater and ends up increasing the noise coming from the indoor unit.

It is a problem of the present invention to reduce the noise coming from an indoor unit in an air conditioning apparatus that has an outdoor unit that has a compressor and an outdoor heat exchanger, an indoor unit that has an indoor heat exchanger, and a liquid refrigerant connection pipe and a gas refrigerant connection pipe that interconnect both units and in which a liquid pressure adjusting expansion valve that reduces the pressure of refrigerant flowing through the liquid refrigerant connection pipe in such a way that the refrigerant is in a gas-liquid two-phase state is provided in an outdoor liquid refrigerant pipe that interconnects the liquid-side end of the outdoor heat exchanger and the liquid refrigerant connection pipe.

An air conditioning apparatus pertaining to a first aspect has an outdoor unit that has a compressor and an outdoor heat exchanger, an indoor unit that has an indoor heat exchanger, and a liquid refrigerant connection pipe and a gas refrigerant connection pipe that interconnect the outdoor unit and the indoor unit. Additionally, here, the outdoor unit further has, in an outdoor liquid refrigerant pipe that interconnects a liquid-side end of the outdoor heat exchanger and the liquid refrigerant connection pipe, a liquid pressure adjusting expansion valve which, when a refrigerant circulates in the order of the compressor, the outdoor heat exchanger, the liquid refrigerant connection pipe, the indoor heat exchanger, the gas refrigerant connection pipe, and the compressor, reduces a pressure of the refrigerant flowing through the liquid refrigerant connection pipe in such a way that the refrigerant is in a gas-liquid two-phase state. Moreover, here, an external expansion valve unit having an external expansion valve that further reduces the pressure of the refrigerant whose pressure has been reduced in the liquid pressure adjusting expansion valve is provided in the liquid refrigerant connection pipe.

Here, as described above, the action of reducing to a low pressure the pressure of the refrigerant in the gas-liquid two-phase state whose pressure has been reduced in the liquid pressure adjusting expansion valve is performed in the external expansion valve provided in the liquid refrigerant connection pipe, so the refrigerant passing sound that occurs when refrigerant in a gas-liquid two-phase state flows into an expansion valve can be kept from occurring in the indoor unit.

Because of this, here, by providing the external expansion valve unit having the external expansion valve in the liquid refrigerant connection pipe in the configuration having the liquid pressure adjusting expansion valve and reducing the pressure of the refrigerant in the gas-liquid two-phase state whose pressure has been reduced in the liquid pressure adjusting expansion valve, noise coming from the indoor unit can be reduced.

An air conditioning apparatus pertaining to a second aspect is the air conditioning apparatus pertaining to the first aspect, wherein a sound deadening material is provided on the external expansion valve unit or the external expansion valve.

When the pressure reduction of the refrigerant in the gas-liquid two-phase state whose pressure has been reduced in the liquid pressure adjusting expansion valve is performed by the external expansion valve, noise comes from the external expansion valve unit, and in a case where the external expansion valve unit is disposed near the indoor unit, there is the concern that this noise will travel to the indoor unit.

Therefore, here, as described above, the sound deadening material is provided on the external expansion valve unit or the external expansion valve.

Because of this, here, the occurrence of noise from the external expansion valve unit can be reduced, and the external expansion valve unit can be disposed near the indoor unit.

An air conditioning apparatus pertaining to a third aspect is the air conditioning apparatus pertaining to the first aspect, wherein the external expansion valve unit is provided in a position 5 m or more away, as measured by a length of the liquid refrigerant connection pipe, from a portion of the indoor unit connected to the liquid refrigerant connection pipe.

When the pressure reduction of the refrigerant in the gas-liquid two-phase state whose pressure has been reduced in the liquid pressure adjusting expansion valve is performed by the external expansion valve, noise comes from the external expansion valve unit, and in a case where the external expansion valve unit is disposed near the indoor unit, there is the concern that this noise will travel to the indoor unit.

Therefore, here, as described above, the external expansion valve unit is provided in the position 5 m or more away, as measured by the length of the liquid refrigerant connection pipe, from the portion of the indoor unit connected to the liquid refrigerant connection pipe.

Because of this, here, noise from the external expansion valve unit can be reduced from traveling to the indoor unit.

An air conditioning apparatus pertaining to a fourth aspect is the air conditioning apparatus pertaining to the first aspect, wherein the external expansion valve unit is provided in a position 10 m or more away, as measured by a length of the liquid refrigerant connection pipe, from a portion of the indoor unit connected to the liquid refrigerant connection pipe.

When the pressure reduction of the refrigerant in the gas-liquid two-phase state whose pressure has been reduced in the liquid pressure adjusting expansion valve is performed by the external expansion valve, noise comes from the external expansion valve unit, and in a case where the external expansion valve unit is disposed near the indoor unit, there is the concern that this noise will travel to the indoor unit.

Therefore, here, as described above, the external expansion valve unit is provided in a position 10 m or more away, as measured by the length of the liquid refrigerant connection pipe, from the portion of the indoor unit connected to the liquid refrigerant connection pipe.

Because of this, here, noise from the external expansion valve unit can be sufficiently reduced from traveling to the indoor unit.

An air conditioning apparatus pertaining to a fifth aspect is the air conditioning apparatus pertaining to any of the first to fourth aspects, wherein the external expansion valve unit further has an external liquid-side refrigerant temperature sensor and an external gas-side refrigerant temperature sensor that detect temperatures of the refrigerant at a liquid-side end and a gas-side end of the indoor heat exchanger.

When the refrigerant circulates in the order of the compressor, the outdoor heat exchanger, the liquid refrigerant connection pipe, the indoor heat exchanger, the gas refrigerant connection pipe, and the compressor, sometimes the opening degrees of the external expansion valve is controlled on the basis of the temperatures of the refrigerant at the liquid-side end and the gas-side end of the indoor heat exchanger, and when performing this opening degree control of the external expansion valve, it is preferred that the control be able to be performed in the external expansion valve unit alone.

Therefore, here, as described above, the external liquid-side refrigerant temperature sensor and the external gas-side refrigerant temperature sensor are provided in the external expansion valve unit.

Because of this, here, when the refrigerant circulates in the order of the compressor, the outdoor heat exchanger, the liquid refrigerant connection pipe, the indoor heat exchanger, the gas refrigerant connection pipe, and the compressor, the opening degree control of the external expansion valve based on the temperatures of the refrigerant at the liquid-side end and the gas-side end of the indoor heat exchanger can be performed in the external expansion valve unit alone.

An air conditioning apparatus pertaining to a sixth aspect is the air conditioning apparatus pertaining to any of the first to fifth aspects, wherein the external expansion valve unit further has an external shut-off valve provided in the gas refrigerant connection pipe.

Here, as described above, the external expansion valve unit has not only the external expansion valve but also the external shut-off valve, so by closing the external expansion valve and the external shut-off valve, inflow of the refrigerant from the refrigerant connection pipes side to the indoor unit can be prevented.

An air conditioning apparatus pertaining to a seventh aspect is the air conditioning apparatus pertaining to the sixth aspect, further having a refrigerant leakage detector that detects leakage of the refrigerant, wherein a controller that controls constituent devices of the outdoor unit, the indoor unit, and the external expansion valve unit closes the external expansion valve and the external shut-off valve in a case where the refrigerant leakage detector has detected leakage of the refrigerant. Here, the refrigerant leakage detector may be refrigerant sensor that directly detect refrigerant that has leaked or may be means that estimates the presence/absence of leakage of the refrigerant and the quantity from, for example, the relationship between the temperature of the refrigerant in the indoor heat exchanger and the ambient temperature around the indoor heat exchanger.

Here, as described above, the refrigerant leakage detector is further provided, and the controller is configured to close the external expansion valve and the external shut-off valve in a case where the refrigerant leakage detector has detected leakage of the refrigerant, so inflow of the refrigerant from the refrigerant connection pipes side to the indoor unit can be prevented, and the concentration of the refrigerant in the rooms can be reduced from increasing.

An air conditioning apparatus pertaining to an eighth aspect is the air conditioning apparatus pertaining to any of the first to sixth aspects, wherein the indoor unit further has an indoor expansion valve in an indoor liquid refrigerant pipe that interconnect the liquid refrigerant connection pipe and a liquid-side end of the indoor heat exchanger.

Here, as described above, the external expansion valve unit is provided also with respect to an air conditioning apparatus including indoor unit having the indoor expansion valve. For example, in a case where existing indoor unit has an indoor expansion valve, the external expansion valve unit is provided by retrofitting. For this reason, here, when the refrigerant circulates in the order of the compressor, the outdoor heat exchanger, the liquid refrigerant connection pipe, the indoor heat exchanger, the gas refrigerant connection pipe, and the compressor, the action of reducing to a low pressure the pressure of the refrigerant in the gas-liquid two-phase state whose pressure has been reduced in the liquid pressure adjusting expansion valve can be performed in the external expansion valve and not in the indoor expansion valve.

Because of this, here, by providing the external expansion valve unit also with respect to the air conditioning apparatus including the indoor unit having the indoor expansion valve and reducing the pressure of the refrigerant in the gas-liquid two-phase state whose pressure has been reduced in the liquid pressure adjusting expansion valve, noise coming from the indoor unit can be reduced.

An air conditioning apparatus pertaining to a ninth aspect is the air conditioning apparatus pertaining to the eighth aspect, wherein a controller that controls constituent devices of the outdoor unit, the indoor unit, and the external expansion valve unit completely opens the indoor expansion valve and controls an opening degree of the external expansion valve when the refrigerant circulates in the order of the compressor, the outdoor heat exchanger, the liquid refrigerant connection pipe, the indoor heat exchanger, the gas refrigerant connection pipe, and the compressor and completely opens the indoor expansion valve and controls the opening degree of the external expansion valve when the refrigerant circulates in the order of the compressor, the gas refrigerant connection pipe, the indoor heat exchanger, the liquid refrigerant connection pipe, the outdoor heat exchanger, and the compressor.

An air conditioning apparatus pertaining to a tenth aspect is the air conditioning apparatus pertaining to the ninth aspect, wherein the controller closes the external expansion valve when stopping the compressor from a state in which it is controlling the opening degree of the external expansion valve.

In the air conditioning apparatus including the indoor unit having the indoor expansion valve, normally the controller controls the opening degree of the indoor expansion valve both when the refrigerant circulates in the order of the compressor, the outdoor heat exchanger, the liquid refrigerant connection pipe, the indoor heat exchanger, the gas refrigerant connection pipe, and the compressor and when the refrigerant circulates in the order of the compressor, the gas refrigerant connection pipe, the indoor heat exchanger, the liquid refrigerant connection pipe, the outdoor heat exchanger, and the compressor. Furthermore, when stopping the compressor, normally the controller closes the indoor expansion valve from the state in which it is controlling the opening degree of the indoor expansion valve.

With respect to this, here, as described above, the external expansion valve unit having the external expansion valve is further provided, and the controller controls the opening degree of the external expansion valve instead of the indoor expansion valve when the refrigerant circulates in the order of the compressor, the outdoor heat exchanger, the liquid refrigerant connection pipe, the indoor heat exchanger, the gas refrigerant connection pipe, and the compressor and when the refrigerant circulates in the order of the compressor, the gas refrigerant connection pipe, the indoor heat exchanger, the liquid refrigerant connection pipe, the outdoor heat exchanger, and the compressor. Furthermore, also when stopping the compressor, the controller closes the external expansion valve from the state in which it is controlling the opening degree of the external expansion valve.

This opening degree control including the closing of the external expansion valve by the controller becomes possible by connecting to the external expansion valve the line of the indoor expansion valve that had been connected so as to receive control commands from the controller. It will be noted that it is best for the indoor expansion valve to be fixed completely open when connecting the line to the external expansion valve. For this reason, the controller can perform the opening degree control described above by having the external expansion valve perform as is the control commands issued to the indoor expansion valve, without requiring any changes or additions for controlling the external expansion valve.

In this way, here, the opening degree control that the controller had performed on the indoor expansion valve can be redirected as is to easily perform the opening degree control of the external expansion valve, without making any changes or additions for controlling the external expansion valve to the controller.

An air conditioning apparatus pertaining to an eleventh aspect is the air conditioning apparatus pertaining to the eighth aspect, wherein a controller that controls constituent devices of the outdoor unit, the indoor unit, and the external expansion valve unit completely opens the indoor expansion valve and controls an opening degree of the external expansion valve when the refrigerant circulates in the order of the compressor, the outdoor heat exchanger, the liquid refrigerant connection pipe, the indoor heat exchanger, the gas refrigerant connection pipe, and the compressor and completely opens the external expansion valve and controls an opening degree of the indoor expansion valve when the refrigerant circulates in the order of the compressor, the gas refrigerant connection pipe, the indoor heat exchanger, the liquid refrigerant connection pipe, the outdoor heat exchanger, and the compressor.

An air conditioning apparatus pertaining to a twelfth aspect is the air conditioning apparatus pertaining to the eleventh aspect, wherein the controller, when stopping the compressor from a state in which it has completely opened the indoor expansion valve and is controlling the opening degree of the external expansion valve, closes the external expansion valve while leaving completely open the indoor expansion valve, and, when stopping the compressor from a state in which it has completely opened the external expansion valve and is controlling the opening degree of the indoor expansion valve, closes the indoor expansion valve while leaving completely open the external expansion valve.

In a case where the external expansion valve unit having the external expansion valve is further provided with respect to the air conditioning apparatus including the indoor unit having the indoor expansion valve, it is conceivable for the controller to completely open the indoor expansion valve and control the opening degree of the external expansion valve not only when the refrigerant circulates in the order of the compressor, the outdoor heat exchanger, the liquid refrigerant connection pipe, the indoor heat exchanger, the gas refrigerant connection pipe, and the compressor but also when the refrigerant circulates in the order of the compressor, the gas refrigerant connection pipe, the indoor heat exchanger, the liquid refrigerant connection pipe, the outdoor heat exchanger, and the compressor. Furthermore, when stopping the compressor, it is conceivable for the controller to close the external expansion valve while leaving completely open the indoor expansion valve from a state in which it is controlling the opening degree of the external expansion valve also when the refrigerant circulates in the order of the compressor, the gas refrigerant connection pipe, the indoor heat exchanger, the liquid refrigerant connection pipe, the outdoor heat exchanger, and the compressor.

However, if the controller completely opens the indoor expansion valve and controls the opening degree of the external expansion valve also when the refrigerant circulates in the order of the compressor, the gas refrigerant connection pipe, the indoor heat exchanger, the liquid refrigerant connection pipe, the outdoor heat exchanger, and the compressor, the quantity of refrigerant that accumulates in the portion of the liquid refrigerant connection pipe between the indoor unit and the external expansion valve unit ends up becoming large. Furthermore, also when stopping the compressor, if the controller closes the external expansion valve while leaving completely open the indoor expansion valve from a state in which it is controlling the opening degree of the external expansion valve, the quantity of refrigerant that accumulates in the portion of the liquid refrigerant connection pipe between the indoor unit and the external expansion valve unit ends up becoming large.

Therefore, here, as described above, the controller completely opens the external expansion valve and control the opening degree of the indoor expansion valve when the refrigerant circulates in the order of the compressor, the gas refrigerant connection pipe, the indoor heat exchanger, the liquid refrigerant connection pipe, the outdoor heat exchanger, and the compressor. Furthermore, also when stopping the compressor, the controller closes the indoor expansion valve while leaving completely open the external expansion valve from the state in which it is controlling the opening degree of the indoor expansion valve.

Because of this, here, when the refrigerant circulates in the order of the compressor, the gas refrigerant connection pipe, the indoor heat exchanger, the liquid refrigerant connection pipe, the outdoor heat exchanger, and the compressor, the refrigerant after being reduced in pressure by the indoor expansion valve flows in the portion of the liquid refrigerant connection pipe between the indoor unit and the external expansion valve unit, so the accumulated quantity of refrigerant can be reduced. Furthermore, also when stopping the compressor, the indoor expansion valve is closed, so the accumulated quantity of refrigerant in the portion of the liquid refrigerant connection pipe between the indoor unit and the external expansion valve unit can be reduced.

BRIEF DESCRIPTION OF DRAWINGS

FIG. 17 is a flowchart showing processes in a case where refrigerant leakage has occurred in the air conditioning apparatus pertaining to example modification 6 of the invention.

DESCRIPTION OF EMBODIMENT

An embodiment of an air conditioning apparatus pertaining to the invention will be described below on the basis of the drawings. It will be noted that the specific configuration of the embodiment of the air conditioning apparatus pertaining to the invention is not limited to the following embodiment and example modifications thereof and can be changed in a range that does not depart from the spirit of the invention.

(1) Configuration

Figure 1:
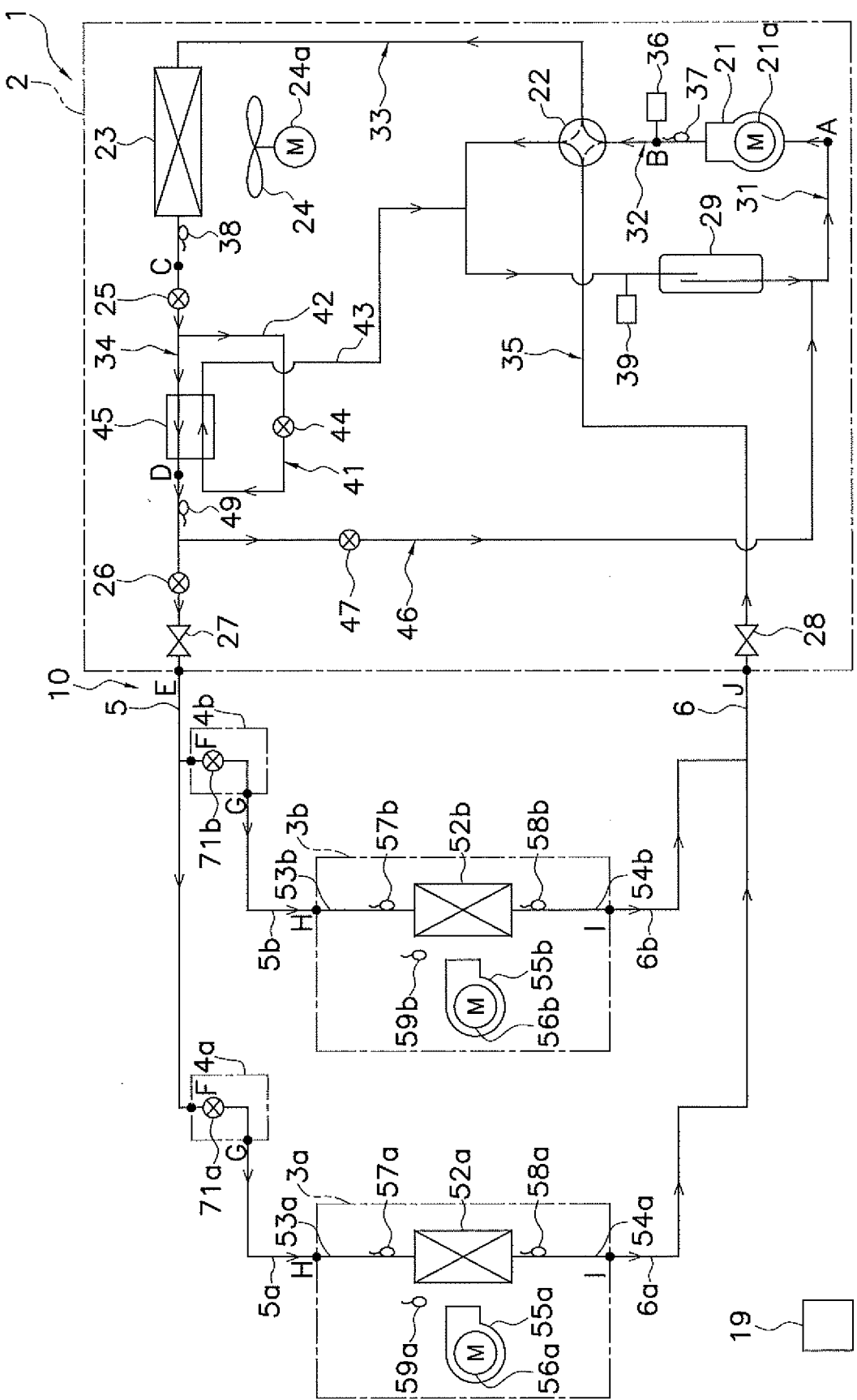
FIG. 1 is a general configuration diagram of an air conditioning apparatus pertaining to an embodiment of the invention (showing the flow of refrigerant in a cooling operation).

FIG. 1 is a general configuration diagram of an air conditioning apparatus 1 pertaining to the embodiment of the invention. The air conditioning apparatus 1 is an apparatus that performs cooling and heating of rooms in a building, for example, by means of a vapor compression refrigeration cycle. The air conditioning apparatus 1 mainly has an outdoor unit 2, plural (here, two) indoor units 3a, 3b connected in parallel to each other, a liquid refrigerant connection pipe 5 and a gas refrigerant connection pipe 6 that interconnect the outdoor unit 2 and the indoor units 3a, 3b, plural (here, two) external expansion valve units 4a, 4b that are provided in the liquid refrigerant connection pipe 5, and a control unit 19 that controls constituent devices of the outdoor unit 2, the indoor units 3a, 3b, and the external expansion valve units 4a, 4b. Additionally, a vapor compression refrigerant circuit 10 of the air conditioning apparatus 1 is configured by interconnecting, via the liquid refrigerant connection pipe 5 and the gas refrigerant connection pipe 6, the outdoor unit 2, the plural indoor units 3a, 3b, and the plural external expansion valve units 4a, 4b. The refrigerant circuit 10 is charged with refrigerant such as R32.

<Refrigerant Connection Pipes>

The liquid refrigerant connection pipe 5 mainly has a junction pipe portion that extends from the outdoor unit 2 and branch pipe portions 5a, 5b that branch off into plural (here, two) pipes in front of the indoor units 3a, 3b. Furthermore, the gas refrigerant connection pipe 6 mainly has a junction pipe portion that extends from the outdoor unit 2 and branch pipe portions 6a, 6b that branch off into plural (here, two) pipes in front of the indoor units 3a, 3b.

<Indoor Units>

The indoor units 3a, 3b are installed in the rooms of the building, for example. As described above, the indoor units 3a, 3b are connected to the outdoor unit 2 via the liquid refrigerant connection pipe 5, which includes the external expansion valve units 4a, 4b, and the gas refrigerant connection pipe 6 and configures part of the refrigerant circuit 10.

Next, the configuration of the indoor units 3a, 3b will be described. It will be noted that the indoor unit 3a and the indoor unit 3b have the same configuration, so here just the configuration of the indoor unit 3a will be described, and regarding the configuration of the indoor unit 3b, the suffix "b" will be added instead of the suffix "a" indicating the parts of the indoor unit 3a, and description of the parts of the indoor unit 3b will be omitted.

The indoor unit 3a mainly has an indoor heat exchanger 52a. Furthermore, the indoor unit 3a has an indoor liquid refrigerant pipe 53a, which interconnects the liquid-side end of the indoor heat exchanger 52a and the liquid refrigerant connection pipe 5, and an indoor gas refrigerant pipe 54a, which interconnects the gas-side end of the indoor heat exchanger 52a and the gas refrigerant connection pipe 6.

The indoor heat exchanger 52a is a heat exchanger that functions as an evaporator of the refrigerant to cool the indoor air or functions as a radiator of the refrigerant to heat the indoor air. Here, the indoor unit 3a has an indoor fan 55a for sucking the indoor air into the indoor unit 3a, causing the indoor air to exchange heat with the refrigerant in the indoor heat exchanger 52a, and thereafter supplying the air as supply air to the room. That is, the indoor unit 3a has the indoor fan 55a as a fan that supplies to the indoor heat exchanger 52a the indoor air serving as a cooling source or a heating source for the refrigerant flowing through the indoor heat exchanger 52a. The indoor fan 55a is driven by an indoor fan motor 56a.

The indoor unit 3a is provided with various sensors. Specifically, the indoor unit 3a is provided with an indoor heat exchange liquid-side sensor 57a that detects a temperature Trl of the refrigerant at the liquid-side end of the indoor heat exchanger 52a, an indoor heat exchange gas-side sensor 58a that detects a temperature Trg of the refrigerant at the gas-side end of the indoor heat exchanger 52a, and an indoor air sensor 59a that detects a temperature Tra of the indoor air sucked into the indoor unit 3a.

<Outdoor Unit>

The outdoor unit 2 is installed outside the building, for example. As described above, the outdoor unit 2 is connected to the indoor units 3a, 3b via the liquid refrigerant connection pipe 5, which includes the external expansion valve units 4a, 4b, and the gas refrigerant connection pipe 6 and configures part of the refrigerant circuit 10.

Next, the configuration of the outdoor unit 2 will be described.

The outdoor unit 2 mainly has a compressor 21 and an outdoor heat exchanger 23. Furthermore, the outdoor unit 2 has a switching mechanism 22 for switching between a radiation operating state that causes the outdoor heat exchanger 23 to function as a radiator of the refrigerant and an evaporation operating state that causes the outdoor heat exchanger 23 to function as an evaporator of the refrigerant. The switching mechanism 22 and the suction side of the compressor 21 are interconnected by a suction refrigerant pipe 31. An accumulator 29 that temporarily accumulates the refrigerant that becomes sucked into the compressor 21 is provided in the suction refrigerant pipe 31. The discharge side of the compressor 21 and the switching mechanism 22 are interconnected by a discharge refrigerant pipe 32. The switching mechanism 22 and the gas-side end of the outdoor heat exchanger 23 are interconnected by a first outdoor gas refrigerant pipe 33. The liquid-side end of the outdoor heat exchanger 23 and the liquid refrigerant connection pipe 5 are interconnected by an outdoor liquid refrigerant pipe 34. A liquid-side stop valve 27 is provided in the portion of the outdoor liquid refrigerant pipe 34 that is connected to the liquid refrigerant connection pipe 5. The switching mechanism 22 and the gas refrigerant connection pipe 6 are interconnected by a second outdoor gas refrigerant pipe 35. A gas-side stop valve 28 is provided in the portion of the second outdoor gas refrigerant pipe 35 that is connected to the gas refrigerant connection pipe 6. The liquid-side stop valve 27 and the gas-side stop valve 28 are valves that are manually opened and closed.

The compressor 21 is a device for compressing the refrigerant; for example, a compressor with a closed structure where a rotary-type or scroll-type positive-displacement compression element (not shown in the drawings) is driven to rotate by a compressor motor 21a is used.

The switching mechanism 22 is a device that can switch the flow of the refrigerant in the refrigerant circuit 10 so as to interconnect the discharge side of the compressor 21 and the gas side of the outdoor heat exchanger 23 (see the solid lines of the switching mechanism 22 in FIG. 1) in the case of causing the outdoor heat exchanger 23 to function as a radiator of the refrigerant (hereinafter called the "outdoor radiation state") and so as to interconnect the suction side of the compressor 21 and the gas side of the outdoor heat exchanger 23 (see the dashed lines of the switching mechanism 22 in FIG. 1) in the case of causing the outdoor heat exchanger 23 to function as an evaporator of the refrigerant (hereinafter called the "outdoor evaporation state"); for example, the switching mechanism 22 comprises a four-port switching valve.

The outdoor heat exchanger 23 is a heat exchanger that functions as a radiator of the refrigerant or functions as an evaporator of the refrigerant. Here, the outdoor unit 2 has an outdoor fan 24 for sucking outdoor air into the outdoor unit 2, causing the outdoor air to exchange heat with the refrigerant in the outdoor heat exchanger 23, and discharging the air to the outside. That is, the outdoor unit 2 has the outdoor fan 24 as a fan that supplies to the outdoor heat exchanger 23 the outdoor air serving as a cooling source or a heating source for the refrigerant flowing through the outdoor heat exchanger 23. Here, the outdoor fan 24 is driven by an outdoor fan motor 24a.

Additionally, the air conditioning apparatus 1 is configured to perform an operation (a cooling operation) in which, focusing on just the compressor 21, the outdoor heat exchanger 23, the liquid refrigerant connection pipe 5, the indoor heat exchangers 52a, 52b, and the gas refrigerant connection pipe 6, the refrigerant circulates in the order of the compressor 21, the outdoor heat exchanger 23, the liquid refrigerant connection pipe 5, the indoor heat exchangers 52a, 52b, the gas refrigerant connection pipe 6, and the compressor 21. Furthermore, the air conditioning apparatus 1 is configured to perform an operation (a heating operation) in which, focusing on just the compressor 21, the outdoor heat exchanger 23, the liquid refrigerant connection pipe 5, the indoor heat exchangers 52a, 52b, and the gas refrigerant connection pipe 6, the refrigerant circulates in the order of the compressor 21, the gas refrigerant connection pipe 6, the indoor heat exchangers 52a, 52b, the liquid refrigerant connection pipe 5, the outdoor heat exchanger 23, and the compressor 21. It will be noted that, here, in the cooling operation the switching mechanism 22 is switched to the outdoor radiation state, and in the heating operation the switching mechanism 22 is switched to the outdoor evaporation state.

Furthermore, here, an outdoor expansion valve 25 and a liquid pressure adjusting expansion valve 26 are provided in the outdoor liquid refrigerant pipe 34. The outdoor expansion valve 25 is an electrically powered expansion valve that reduces the pressure of the refrigerant in the heating operation, and the outdoor expansion valve 25 is provided in the portion of the outdoor liquid refrigerant pipe 34 near the liquid-side end of the outdoor heat exchanger 23. The liquid pressure adjusting expansion valve 26 is an electrically powered expansion valve that reduces the pressure of the refrigerant flowing through the liquid refrigerant connection pipe 5 in the cooling operation in such a way that the refrigerant is in a gas-liquid two-phase state, and the liquid pressure adjusting expansion valve 26 is provided in the portion of the outdoor liquid refrigerant pipe 34 near the liquid refrigerant connection pipe 5. That is, the liquid pressure adjusting expansion valve 26 is provided in the portion of the outdoor liquid refrigerant pipe 34 nearer to the liquid refrigerant connection pipe 5 than the outdoor expansion valve 25.

Additionally, in the air conditioning apparatus 1, in the cooling operation, two-phase conveyance of the refrigerant, in which the refrigerant in the gas-liquid two-phase state is made to flow into the liquid refrigerant connection pipe 5 and is sent from the outdoor unit 2 side to the indoor units 3a, 3b side, is configured to be performed by the liquid pressure adjusting expansion valve 26.

Moreover, here, a refrigerant return pipe 41 is connected to, and a refrigerant cooler 45 is provided in, the outdoor liquid refrigerant pipe 34. The refrigerant return pipe 41 is a refrigerant pipe that diverts some of the refrigerant flowing through the outdoor liquid refrigerant pipe 34 and sends it to the compressor 21. The refrigerant cooler 45 is a heat exchanger that uses the refrigerant flowing through the refrigerant return pipe 41 to cool the refrigerant flowing through the portion of the outdoor liquid refrigerant pipe 34 on the outdoor heat exchanger 23 side of the liquid pressure adjusting expansion valve 26. Here, the outdoor expansion valve 25 is provided in the portion of the outdoor liquid refrigerant pipe 34 on the outdoor heat exchanger 23 side of the refrigerant cooler 45. Furthermore, the liquid pressure adjusting expansion valve 26 is provided in the portion of the outdoor liquid refrigerant pipe 34 (here, the portion between the refrigerant cooler 45 and the liquid-side stop valve 27) on the liquid refrigerant connection pipe 5 side of the portion to which the refrigerant cooler 45 is connected.

The refrigerant return pipe 41 is a refrigerant pipe that sends to the suction side of the compressor 21 the refrigerant diverted from the outdoor liquid refrigerant pipe 34. Additionally, the refrigerant return pipe 41 mainly has a refrigerant return inlet pipe 42 and a refrigerant return outlet pipe 43. The refrigerant return inlet pipe 42 is a refrigerant pipe that diverts some of the refrigerant flowing through the outdoor liquid refrigerant pipe 34 from the portion of the outdoor liquid refrigerant pipe 34 between the liquid-side end of the outdoor heat exchanger 23 and the liquid pressure adjusting expansion valve 26 (here, the portion between the outdoor expansion valve 25 and the refrigerant cooler 45) and sends it to the inlet of the refrigerant cooler 45 on the refrigerant return pipe 41 side. A refrigerant return expansion valve 44 that reduces the pressure of the refrigerant flowing through the refrigerant return pipe 41 and at the same time adjusts the flow rate of the refrigerant flowing through the refrigerant cooler 45 is provided in the refrigerant return inlet pipe 42. Here, the refrigerant return expansion valve 44 comprises an electrically powered expansion valve. The refrigerant return outlet pipe 43 is a refrigerant pipe that sends the diverted refrigerant from the outlet of the refrigerant cooler 45 on the refrigerant return pipe 41 side to the suction refrigerant pipe 31. Moreover, the refrigerant return outlet pipe 43 of the refrigerant return pipe 41 is connected to the portion of the suction refrigerant pipe 31 on the inlet side of the accumulator 29. Additionally, the refrigerant cooler 45 is configured to use the refrigerant flowing through the refrigerant return pipe 41 to cool the refrigerant flowing through the outdoor liquid refrigerant pipe 34.

Moreover, here, a liquid injection pipe 46 that diverts some of the refrigerant flowing through the outdoor liquid refrigerant pipe 34 and sends it to the compressor 21 is connected to the outdoor liquid refrigerant pipe 34. The liquid injection pipe 46 is connected to the portion of the outdoor liquid refrigerant pipe 34 on the outdoor heat exchanger 23 side of the liquid pressure adjusting expansion valve 26. More specifically, the liquid injection pipe 46 is connected to the portion of the outdoor liquid refrigerant pipe 34 between the refrigerant cooler 45 and the liquid pressure adjusting expansion valve 26. Furthermore, the liquid injection pipe 46 is connected to the suction refrigerant pipe 31 through which flows the refrigerant that becomes sucked into the compressor 21. Moreover, the liquid injection pipe 46 is connected to the portion of the suction refrigerant pipe 31 on the outlet side of the accumulator 29. A liquid injection expansion valve 47 that reduces the pressure of the refrigerant that has been diverted from the outdoor liquid refrigerant pipe 34 is provided in the liquid injection pipe 46. The liquid injection expansion valve 47 comprises an electrically powered expansion valve.

The outdoor unit 2 is provided with various sensors. Specifically, the outdoor unit 2 is provided with a discharge pressure sensor 36 that detects the pressure (a discharge pressure Pd) of the refrigerant that has been discharged from the compressor 21, a discharge temperature sensor 37 that detects the temperature (a discharge temperature Td) of the refrigerant that has been discharged from the compressor 21, and a suction pressure sensor 39 that detects the pressure (a suction pressure Ps) of the refrigerant that becomes sucked into the compressor 21. Furthermore, the outdoor unit 2 is provided with an outdoor heat exchange-side sensor 38, which detects a temperature Tol (an outdoor heat exchange outlet temperature Tol) of the refrigerant at the liquid-side end of the outdoor heat exchanger 23, and a liquid pipe temperature sensor 49, which detects a temperature (a liquid pipe temperature Tlp) of the refrigerant in the portion of the outdoor liquid refrigerant pipe 34 between the refrigerant cooler 45 and the liquid pressure adjusting expansion valve 26.

<External Expansion Valve Units>

The external expansion valve units 4a, 4b are installed together with the indoor units 3a, 3b in the rooms of the building, for example. The external expansion valve units 4a, 4b are interposed together with the liquid refrigerant connection pipe 5 between the indoor units 3a, 3b and the outdoor unit 2 and configure part of the refrigerant circuit 10.

Next, the configuration of the external expansion valve units 4a, 4b will be described. It will be noted that the external expansion valve unit 4a and the external expansion valve unit 4b have the same configuration, so here just the configuration of the external expansion valve unit 4a will be described, and regarding the configuration of the external expansion valve unit 4b, the suffix "b" will be added instead of the suffix "a" indicating the parts of the external expansion valve unit 4a, and description of the parts of the external expansion valve unit 4b will be omitted.

The external expansion valve unit 4a is provided in the branch pipe portion 5a of the liquid refrigerant connection pipe 5 and mainly has an external expansion valve 71a. The external expansion valve 71a is an electrically powered expansion valve that further reduces the pressure of the refrigerant whose pressure has been reduced in the liquid pressure adjusting expansion valve 26 in the cooling operation. Furthermore, the external expansion valve 71a reduces the pressure of the refrigerant that has radiated heat in the indoor heat exchanger 52a in the heating operation.

<Control Unit>

The control unit 19 is configured as a result of control boards (not shown in the drawings), for example, provided in the outdoor unit 2 and the indoor units 3a, 3b, for example, being communicably interconnected. It will be noted that, in FIG. 1, for the sake of convenience the control unit 19 is shown in a position away from the outdoor unit 2, the indoor units 3a, 3b, and the external expansion valve units 4a, 4b. The control unit 19 is configured to perform control of the various constituent devices 21, 22, 24, 25, 26, 44, 47, 55a, 55b, 71a, and 71b of the air conditioning apparatus 1 (here, the outdoor unit 2, the indoor units 3a, 3b, and the external expansion valve units 4a, 4b)—that is, operation control of the entire air conditioning apparatus 1—on the basis of, for example, detection signals of the various sensors 36, 37, 38, 39, 49, 57a, 57b, 58a, 58b, 59a, and 59b described above.

(2) Actions and Characteristics of Air Conditioning Apparatus

Next, the actions and characteristics of the air conditioning apparatus 1 will be described using FIG. 1 to FIG. 4.

In the air conditioning apparatus 1, as described above, the cooling operation and the heating operation are performed. Additionally, in the cooling operation, the two-phase conveyance of the refrigerant, in which the refrigerant in the gas-liquid two-phase state is made to flow into the liquid refrigerant connection pipe 5 and is sent from the outdoor unit 2 side to the indoor units 3a, 3b side, is performed by the liquid pressure adjusting expansion valve 26 provided in the outdoor liquid refrigerant pipe 34. Moreover, in the cooling operation, the action of further reducing, with the external expansion valves 71a, 71b, the pressure of the refrigerant whose pressure has been reduced in the liquid pressure adjusting expansion valve 26 is performed. Furthermore, in the heating operation, the action of reducing, with the external expansion valves 71a, 71b, the pressure of the refrigerant that has radiated heat in the indoor heat exchangers 52a, 52b is performed. It will be noted that the actions of the air conditioning apparatus 1 described below are performed by the control unit 19 that controls the constituent devices of the air conditioning apparatus 1.

—Cooling Operation—

In the cooling operation, for example, when all the indoor units 3a, 3b perform the cooling operation (i.e., an operation where all the indoor heat exchangers 52a, 52b function as evaporators of the refrigerant and the outdoor heat exchanger 23 functions as a radiator of the refrigerant), the switching mechanism 22 is switched to the outdoor radiation state (the state indicated by the solid lines of the switching mechanism 22 in FIG. 1), and the compressor 21, the outdoor fan 24, and the indoor fans 55a, 55b are driven.

Figure 2:
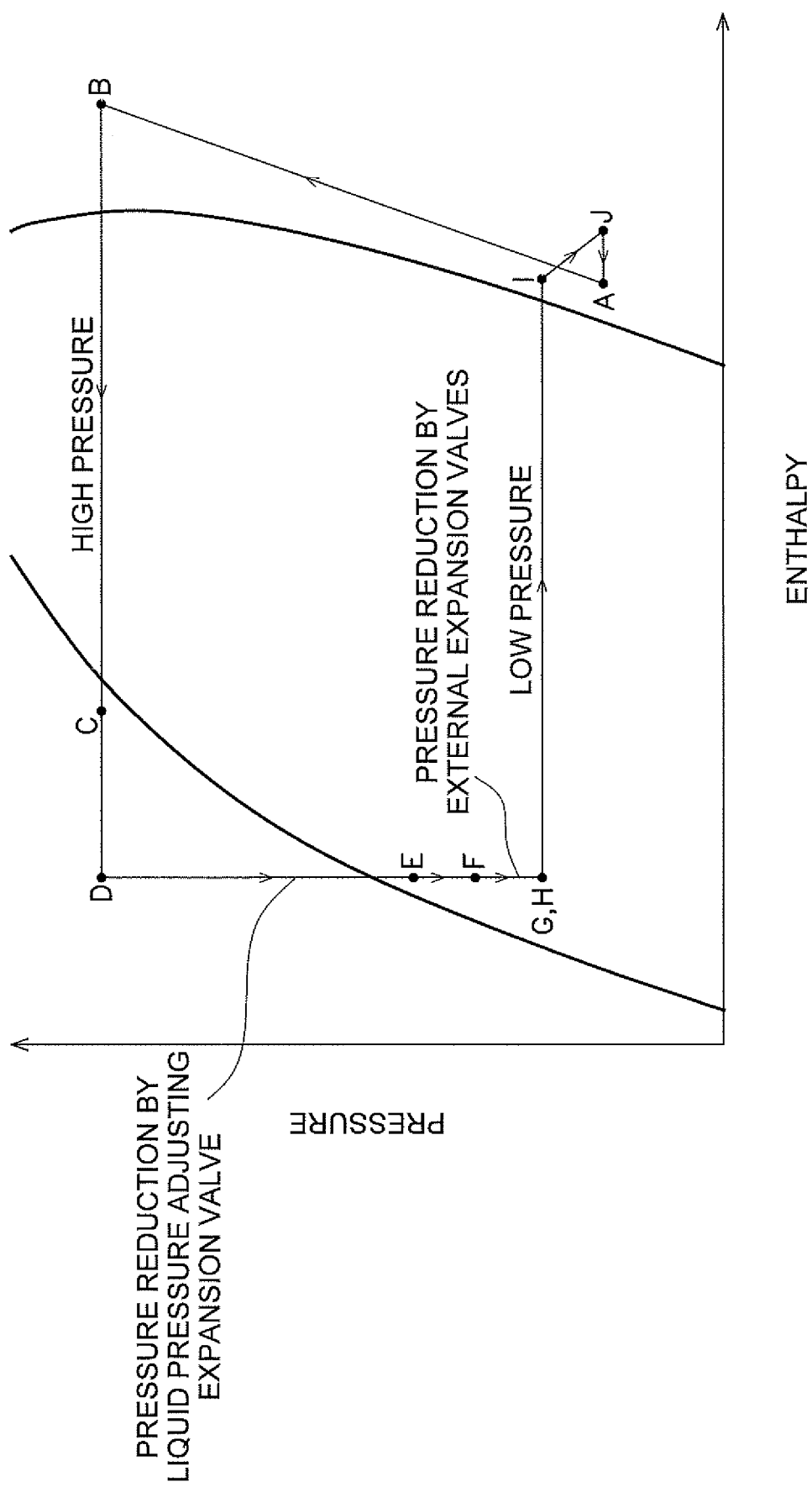
FIG. 2 is a pressure-enthalpy diagram showing a refrigeration cycle in the cooling operation in the air conditioning apparatus pertaining to the embodiment of the invention.

When this happens, the high-pressure refrigerant discharged from the compressor 21 is sent through the switching mechanism 22 to the outdoor heat exchanger 23 (see point B in FIGS. 1 and 2). The refrigerant sent to the outdoor heat exchanger 23 condenses as a result of exchanging heat with, and being cooled by, the outdoor air supplied by the outdoor fan 24 in the outdoor heat exchanger 23 functioning as a radiator of the refrigerant (see point C in FIGS. 1 and 2). This refrigerant travels through the outdoor expansion valve 25, the refrigerant cooler 45, the liquid pressure adjusting expansion valve 26, and the liquid-side stop valve 27 and flows out from the outdoor unit 2 (see point E in FIGS. 1 and 2).

The refrigerant that has flowed out from the outdoor unit 2 travels through the liquid refrigerant connection pipe 5, branches off, and is sent to the external expansion valve units 4a, 4b (see points F in FIGS. 1 and 2). The refrigerant sent to the external expansion valve units 4a, 4b is reduced in pressure to a low pressure by the external expansion valves 71a, 71b. This refrigerant flows out from the external expansion valve units 4a, 4b (See points G in FIGS. 1 and 2).

The refrigerant that has flowed out from the external expansion valve units 4a, 4b is sent to the indoor units 3a, 3b through the portions of the branch pipe portions 5a, 5b of the liquid refrigerant connection pipe 5 that interconnect the external expansion valve units 4a, 4b and the indoor units 3a, 3b (see points H in FIGS. 1 and 2). The refrigerant sent to the indoor units 3a, 3b is sent to the indoor heat exchangers 52a, 52b. The refrigerant sent to the indoor heat exchangers 52a, 52b evaporates as a result of exchanging heat with, and being heated by, the indoor air supplied from the rooms by the indoor fans 55a, 55b in the indoor heat exchangers 52a, 52b functioning as evaporators of the refrigerant (see points I in FIGS. 1 and 2). This refrigerant flows out from the indoor units 3a, 3b. Meanwhile, the indoor air that has been cooled in the indoor heat exchangers 52a, 52b is sent to the rooms, whereby cooling of the rooms is performed.

The refrigerant that has flowed out from the indoor units 3a, 3b merges and is sent to the outdoor unit 2 through the gas refrigerant connection pipe 6 (see point J in FIGS. 1 and 2). The refrigerant sent to the outdoor unit 2 travels through the gas-side stop valve 28, the switching mechanism 22, and the accumulator 29 and is sucked into the compressor 21 (see point A in FIGS. 1 and 2).

Here, in the cooling operation described above, the two-phase conveyance of the refrigerant, in which the refrigerant in the gas-liquid two-phase state is made to flow into the liquid refrigerant connection pipe 5 and is sent from the outdoor unit 2 side to the indoor units 3a, 3b side, is configured to be performed by the liquid pressure adjusting expansion valve 26. Furthermore, here, the air conditioning apparatus 1 is configured to be able to well perform the two-phase conveyance of the refrigerant by cooling, with the refrigerant return pipe 41 and the refrigerant cooler 45, the refrigerant flowing through the outdoor liquid refrigerant pipe 34 to reduce fluctuations in the liquid pipe temperature Tlp in the portion of the outdoor liquid refrigerant pipe 34 between the refrigerant cooler 45 and the liquid pressure adjusting expansion valve 26 and also reducing, with the liquid injection pipe 46, an increase in the discharge temperature Td of the compressor 21. Moreover, here, the air conditioning apparatus 1 is configured to further reduce, with the external expansion valves 71a, 71b, the pressure of the refrigerant in the gas-liquid two-phase state whose pressure has been reduced in the liquid pressure adjusting expansion valve 26 and send the refrigerant to the indoor units 3a, 3b.

First, the control unit 19 is configured to cause the pressure reduction by the liquid pressure adjusting expansion valve 26 to be performed in such a way that the refrigerant flowing through the liquid refrigerant connection pipe 5 is in a gas-liquid two-phase state (see points D and E in FIGS. 1 and 2). The refrigerant after being reduced in pressure by the liquid pressure adjusting expansion valve 26 is intermediate-pressure refrigerant whose pressure is lower than that of the high-pressure refrigerant and whose pressure is higher than that of the low-pressure refrigerant (see point E in FIGS. 1 and 2). Here, the control unit 19 controls the opening degree of the liquid pressure adjusting expansion valve 26 in such a way that a degree of subcooling SCo of the refrigerant at the liquid-side end of the outdoor heat exchanger 23 becomes a target degree of subcooling SCot. Specifically, the control unit 19 obtains the degree of subcooling SCo of the refrigerant at the liquid-side end of the outdoor heat exchanger 23 from the outdoor heat exchange liquid-side temperature Tol. The control unit 19 obtains the degree of subcooling SCo of the refrigerant at the liquid-side end of the outdoor heat exchanger 23 by subtracting the outdoor heat exchange outlet temperature Tol from a temperature Toc of the refrigerant obtained by converting the discharge pressure Pd to a saturation temperature. Then, in a case where the degree of subcooling SCo is greater than the target degree of subcooling SCot, the control unit 19 performs control that increases the opening degree of the liquid pressure adjusting expansion valve 26, and in a case where the degree of subcooling SCo is smaller than the target degree of subcooling SCot, the control unit 19 performs control that decreases the opening degree of the liquid pressure adjusting expansion valve 26. It will be noted that at this time the control unit 19 performs control that fixes in a completely open state the opening degree of the outdoor expansion valve 25.

Because of this control, the refrigerant flowing through the liquid refrigerant connection pipe 5 is in a gas-liquid two-phase state, so compared to a case where the refrigerant flowing through the liquid refrigerant connection pipe 5 is in a liquid state, the refrigerant connection pipe 5 is no longer filled with refrigerant in a liquid state, and the quantity of refrigerant that exists in the liquid refrigerant connection pipe 5 can be decreased by that much.

Furthermore, the control unit 19 uses the refrigerant flowing through the refrigerant return pipe 41 to cool, in the refrigerant cooler 45, the refrigerant flowing through the portion of the outdoor liquid refrigerant pipe 34 on the outdoor heat exchanger 23 side of the liquid pressure adjusting expansion valve 26 and keep constant the temperature (the liquid pipe temperature Tlp) of the refrigerant in the portion of the outdoor liquid refrigerant pipe 34 between the refrigerant cooler 45 and the liquid pressure adjusting expansion valve 26. Here, the control unit 19 controls the opening degree of the refrigerant return expansion valve 44 in such a way that the temperature (the liquid pipe temperature Tlp) of the refrigerant in the portion of the outdoor liquid refrigerant pipe 34 between the refrigerant cooler 45 and the liquid pressure adjusting expansion valve 26 becomes a target liquid pipe temperature Tlpt. Specifically, in a case where the liquid pipe temperature Tlp is higher than the target liquid pipe temperature Tlpt, the control unit 19 performs control that increases the opening degree of the refrigerant return expansion valve 44, and in a case where the liquid pipe temperature Tlp is lower than the target liquid pipe temperature Tlpt, the control unit 19 performs control that decreases the opening degree of the refrigerant return expansion valve 44.

Because of this control, the temperature (the liquid pipe temperature Tlp) of the refrigerant in the portion of the outdoor liquid refrigerant pipe 34 between the refrigerant cooler 45 and the liquid pressure adjusting expansion valve 26 can be maintained at a constant at the target liquid pipe temperature Tlpt (see point J in FIGS. 1 and 2). Additionally, by keeping the liquid pipe temperature Tlp constant to reduce fluctuations, the refrigerant flowing through the liquid refrigerant connection pipe 5 after being reduced in pressure by the liquid pressure adjusting expansion valve 26 can be reliably maintained in the desired gas-liquid two-phase state (see point F in FIG. 2).

Moreover, to reduce an increase in the discharge temperature Td of the compressor 21, the control unit 19 is configured to divert some of the refrigerant flowing through the outdoor liquid refrigerant pipe 34 and send it to the compressor 21 (here, the suction refrigerant pipe 31 connected to the suction side of the compressor 21). Here, the control unit 19 controls the opening degree of the liquid injection expansion valve 47 so that the discharge temperature Td of the compressor 21 does not exceed an upper limit discharge temperature Tdx. Specifically, in a case where the discharge temperature Td has risen above the upper limit discharge temperature Tdx, the control unit 19 performs control that increases the opening degree of the liquid injection expansion valve 47 so that the discharge temperature Td becomes equal or less than the upper limit discharge temperature Tdx.

Because of this control, the refrigerant that has been sent from the indoor units 3a, 3b to the outdoor unit 2 (point J in FIGS. 1 and 2) merges with and is cooled by the refrigerant sent through the liquid injection pipe 46 to the compressor 21 (see points J and A in FIGS. 1 and 2), so an increase in the discharge temperature Td of the compressor 21 can be reduced in accordance with the extent of that cooling (see point B in FIGS. 1 and 2).

Additionally, the control unit 19 controls the opening degrees of the external expansion valves 71a, 71b in such a way that a degree of superheat SHr of the refrigerant at the gas-side ends of the indoor heat exchangers 52a, 52b becomes a target degree of superheat SHrt. Specifically, the control unit 19 obtains the degree of superheat SHr of the refrigerant at the gas-side ends of the indoor heat exchangers 52a, 52b by subtracting the indoor heat exchange liquid-side temperature Trl from the indoor heat exchange gas-side temperature Trg. Then, in a case where the degree of superheat SHr is greater than the target degree of superheat SHrt, the control unit 19 performs control that increases the opening degrees of the external expansion valves 71a, 71b, and in a case where the degree of superheat SHr is smaller than the target degree of superheat SHrt, the control unit 19 performs control that decreases the opening degrees of the external expansion valves 71a, 71b.

Because of this control, the action (see points F and G in FIGS. 1 and 2) of reducing to a low pressure the pressure of the refrigerant in the gas-liquid two-phase state whose pressure has been reduced in the liquid pressure adjusting expansion valve 26 can be performed in the external expansion valves 71a, 71b provided in the liquid refrigerant connection pipe 5, so the refrigerant passing sound that occurs when refrigerant in a gas-liquid two-phase state flows into an expansion valve can be kept from occurring in the indoor units 3a, 3b.

In this way, here, by providing the external expansion valve units 4a, 4b having the external expansion valves 71a, 71b in the liquid refrigerant connection pipe 5 in the configuration having the liquid pressure adjusting expansion valve 26 and reducing the pressure of the refrigerant in the gas-liquid two-phase state whose pressure has been reduced in the liquid pressure adjusting expansion valve 26, noise coming from the indoor units 3a, 3b can be reduced.

—Heating Operation—

Figure 3:
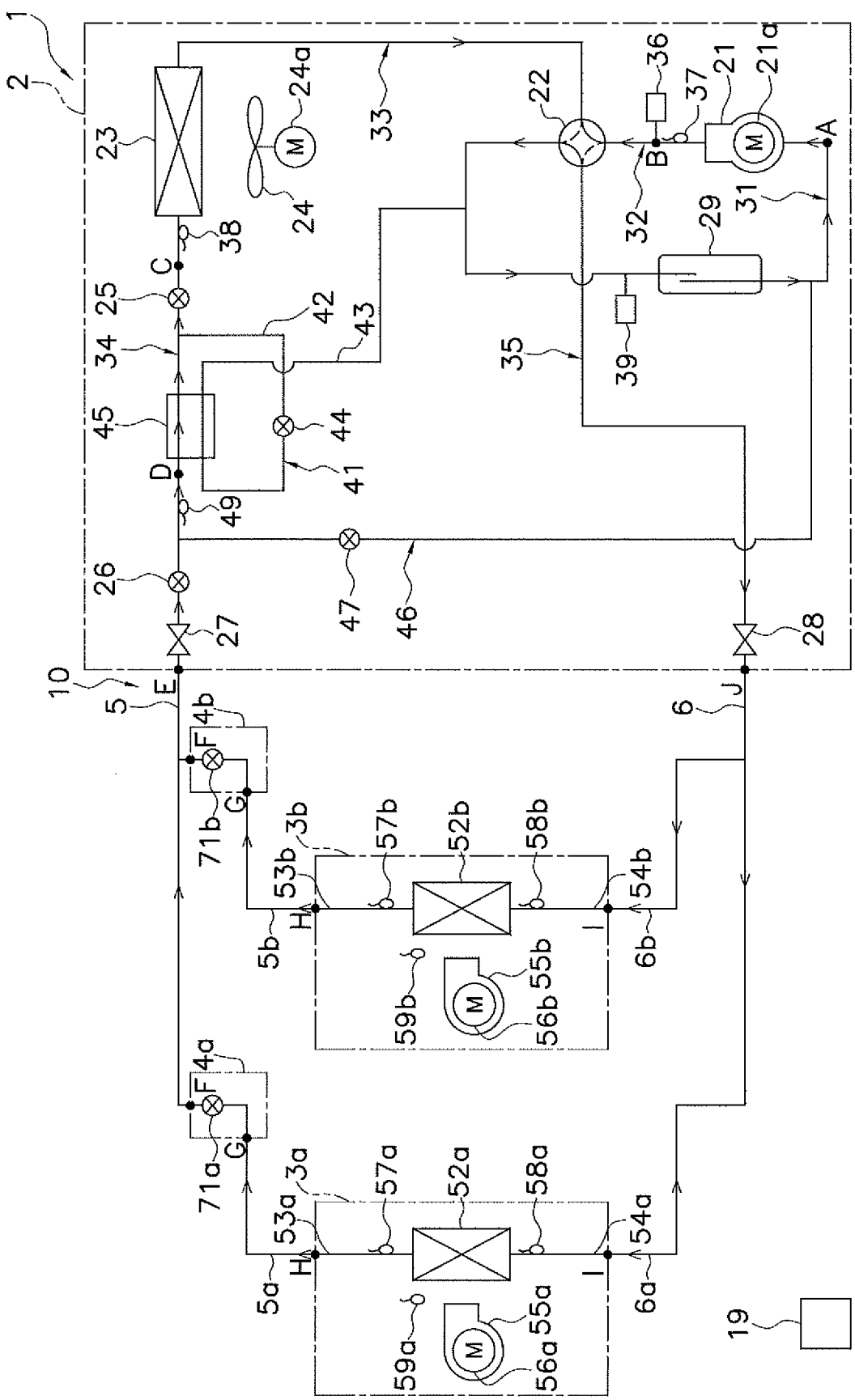
FIG. 3 is a diagram showing the flow of refrigerant in a heating operation of the air conditioning apparatus pertaining to the embodiment of the invention.

In the heating operation, for example, when all the indoor units 3a, 3b perform the heating operation (i.e., an operation where all the indoor heat exchangers 52a, 52b function as radiators of the refrigerant and the outdoor heat exchanger 23 functions as an evaporator of the refrigerant), the switching mechanism 22 is switched to the outdoor evaporation state (the state indicated by the dashed lines of the switching mechanism 22 in FIG. 3), and the compressor 21, the outdoor fan 24, and the indoor fans 55a, 55b are driven.

Figure 4:
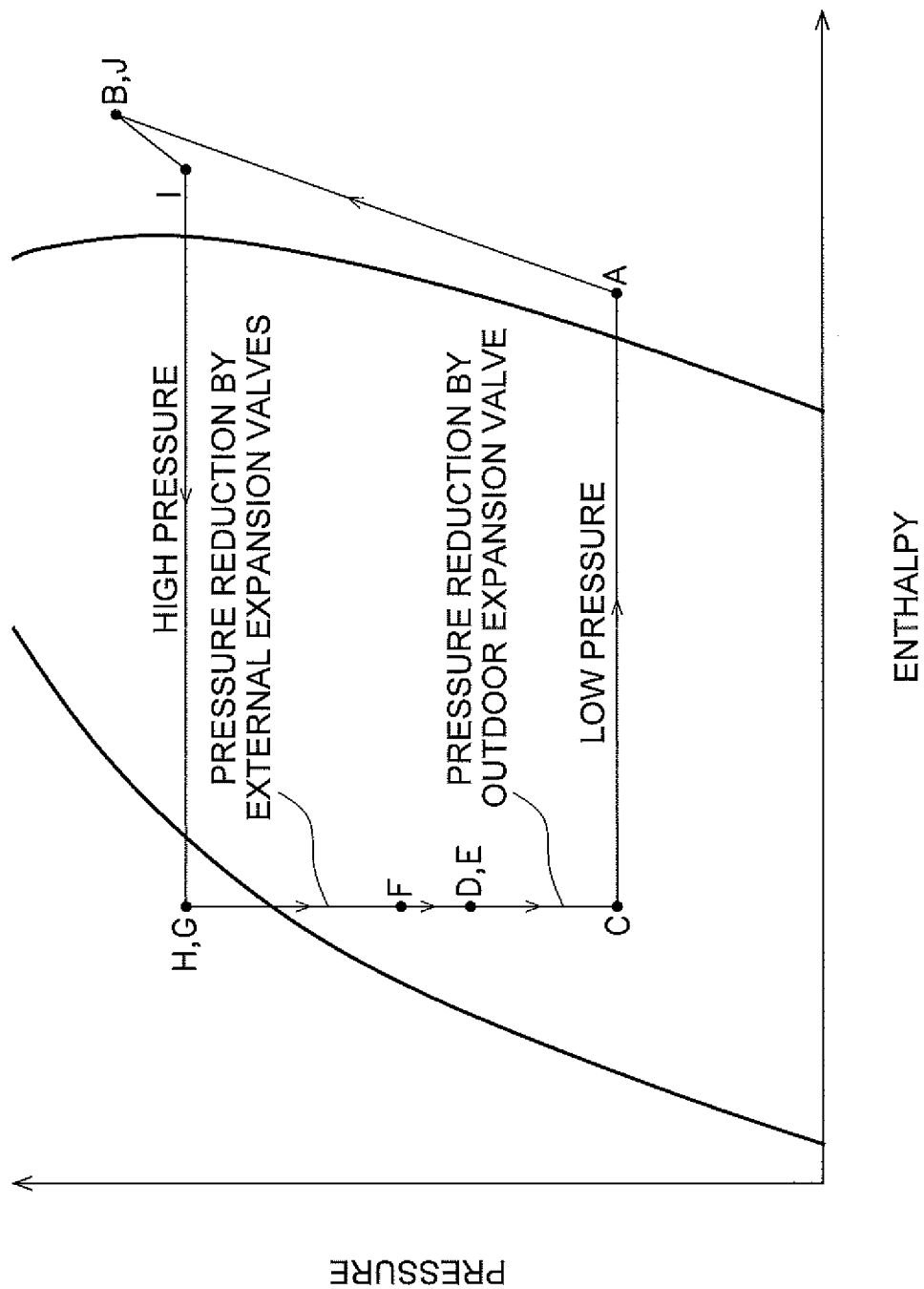
FIG. 4 is a pressure-enthalpy diagram showing a refrigeration cycle in the heating operation in the air conditioning apparatus pertaining to the embodiment of the invention.

When this happens, the high-pressure refrigerant discharged from the compressor 21 travels through the switching mechanism 22 and the gas-side stop valve 28 and flows out from the outdoor unit 2 (see point J in FIGS. 3 and 4).

The refrigerant that has flowed out from the outdoor unit 2 travels through the gas refrigerant connection pipe 6, branches off, and is sent to the indoor units 3a, 3b (see points I in FIGS. 3 and 4). The refrigerant sent to the indoor units 3a, 3b is sent to the indoor heat exchangers 52a, 52b. The high-pressure refrigerant sent to the indoor heat exchangers 52a, 52b condenses as a result of exchanging heat with, and being cooled by, the indoor air supplied from the rooms by the indoor fans 55a, 55b in the indoor heat exchangers 52a, 52b functioning as radiators of the refrigerant. This refrigerant flows out from the indoor units 3a, 3b (see points H in FIGS. 3 and 4). Meanwhile, the indoor air that has been heated in the indoor heat exchangers 52a, 52b is sent to the rooms, whereby heating of the rooms is performed.

The refrigerant that has flowed out from the indoor units 3a, 3b is sent to the external expansion valve units 4a, 4b through the portions of the branch pipe portions 5a, 5b of the liquid refrigerant connection pipe 5 that interconnect the external expansion valve units 4a, 4b and the indoor units 3a, 3b (see points G in FIGS. 3 and 4). The refrigerant sent to the external expansion valve units 4a, 4b is reduced in pressure by the external expansion valves 71a, 71b. This refrigerant flows out from the external expansion valve units 4a, 4b. (See points F in FIGS. 3 and 4).

The refrigerant that has flowed out from the external expansion valve units 4a, 4b merges and is sent to the outdoor unit 2 through the liquid refrigerant connection pipe 5 (see point E in FIGS. 3 and 4). The refrigerant sent to the outdoor unit 2 is sent through the liquid-side stop valve 27, the liquid pressure adjusting expansion valve 26, and the refrigerant cooler 45 to the outdoor expansion valve 25 (see point D in FIGS. 3 and 4). The refrigerant sent to the outdoor expansion valve 25 is reduced in pressure to a low pressure by the outdoor expansion valve 25 and thereafter is sent to the outdoor heat exchanger 23 (see point C in FIGS. 3 and 4). The refrigerant sent to the outdoor heat exchanger 23 evaporates as a result of exchanging heat with, and being heated by, the outdoor air supplied by the outdoor fan 24 (see point A in FIGS. 3 and 4). This refrigerant travels through the switching mechanism 22 and the accumulator 29 and is sucked into the compressor 21.

Additionally, the control unit 19 controls the opening degrees of the external expansion valves 71a, 71b in such a way that a degree of subcooling SCr of the refrigerant at the liquid-side ends of the indoor heat exchangers 52a, 52b becomes a target degree of subcooling SCrt. Specifically, the control unit 19 obtains the degree of subcooling SCr of the refrigerant at the liquid-side ends of the indoor heat exchangers 52a, 52b from the indoor heat exchange liquid-side temperature Trl. The control unit 19 obtains the degree of subcooling SCr of the refrigerant at the liquid-side ends of the indoor heat exchangers 52a, 52b by subtracting the indoor heat exchange liquid-side temperature Trl from a temperature Trc of the refrigerant obtained by converting the discharge pressure Pd to a saturation temperature. Then, in a case where the degree of subcooling SCr is smaller than the target degree of subcooling SCrt, the control unit 19 performs control that decreases the opening degrees of the external expansion valves 71a, 71b, and in a case where the degree of subcooling SCr is greater than the target degree of subcooling SCrt, the control unit 19 performs control that increases the opening degrees of the external expansion valves 71a, 71b.

Furthermore, the control unit 19 is configured to perform control that fixes in a completely open state the opening degree of the liquid pressure adjusting expansion valve 26, and the control unit 19 switches to a completely closed state the opening degrees of the refrigerant return expansion valve 44 and the liquid injection expansion valve 47 so as to not allow the refrigerant to flow in the refrigerant return pipe 41 and the liquid injection pipe 46.

(3) Example Modification 1

In the air conditioning apparatus 1 of the above embodiment (see FIG. 1 to FIG. 4), the pressure reduction of the refrigerant in the gas-liquid two-phase state whose pressure has been reduced in the liquid pressure adjusting expansion valve 26 is configured to be performed by the external expansion valves 71a, 71b, so although noise does not come from the indoor units 3a, 3b, noise comes from the external expansion valve units 4a, 4b. Additionally, in a case where the external expansion valve units 4a, 4b are disposed near the indoor units 3a, 3b, there is the concern that this noise will travel to the indoor units 3a, 3b.

Figure 5:
FIG. 5 is a drawing showing external expansion valve units in the air conditioning apparatus pertaining to example modification 1 of the invention.

Therefore, here, as shown in FIG. 5, a sound deadening material 72a, 72b is provided on the external expansion valve units 4a, 4b or the external expansion valves 71a, 71b.

Because of this, here, the occurrence of noise from the external expansion valve units 4a, 4b can be reduced, and the external expansion valve units 4a, 4b can be disposed near the indoor units 3a, 3b.

(4) Example Modification 2

In the air conditioning apparatus 1 of the above embodiment (see FIG. 1 to FIG. 4), the pressure reduction of the refrigerant in the gas-liquid two-phase state whose pressure has been reduced in the liquid pressure adjusting expansion valve 26 is configured to be performed by the external expansion valves 71a, 71b, so although noise does not come from the indoor units 3a, 3b, noise comes from the external expansion valve units 4a, 4b. Additionally, in a case where the external expansion valve units 4a, 4b are disposed near the indoor units 3a, 3b, there is the concern that this noise will travel to the indoor units 3a, 3b.

Figure 6:
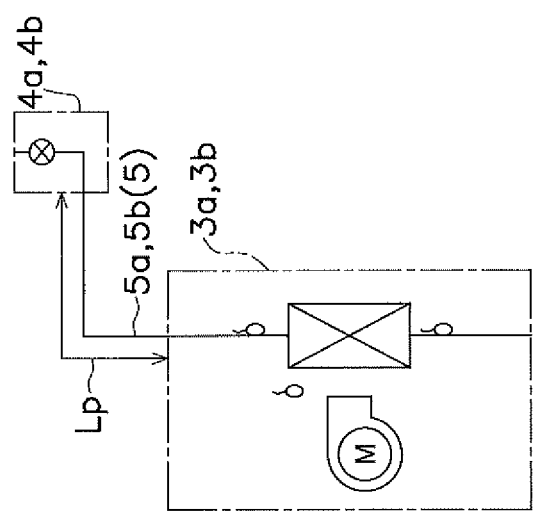
FIG. 6 is a drawing showing the positional relationship between indoor units and the external expansion valve units in the air conditioning apparatus pertaining to example modification 2 of the invention.

Therefore, here, as shown in FIG. 6, the external expansion valve units 4a, 4b are provided in positions 5 m or more away and preferably in positions 10 m or more away, as measured by a length Lp of the liquid refrigerant connection pipe 5, from the portions of the indoor units 3a, 3b connected to the liquid refrigerant connection pipe 5. Specifically, this means that the length Lp of the portions of the branch pipe portions 5a, 5b of the liquid refrigerant connection pipe 5 that interconnect the external expansion valve units 4a, 4b and the indoor units 3a, 3b is 5 m or more and preferably 10 m or more.

Because of this, here, noise from the external expansion valve units 4a, 4b can be reduced from traveling to the indoor units 3a, 3b. Furthermore, here, although it is not shown in the drawings, the length Lp of the portions of the branch pipe portions 5a, 5b of the liquid refrigerant connection pipe 5 that interconnect the external expansion valve units 4a, 4b and the indoor units 3a, 3b may also be shortened in conjunction with the configuration where the sound deadening material of example modification 1 is provided on the external expansion valve units 4a, 4b or the external expansion valves 71a, 71b.

(5) Example Modification 3

In the air conditioning apparatus 1 of the above embodiment and example modifications (see FIG. 1 to FIG. 6), the control unit 19 controls the opening degrees of the external expansion valves 71a, 71b on the basis of the temperatures Trl, Trg of the refrigerant at the liquid-side ends and the gas-side ends of the indoor heat exchangers 52a, 52b when the refrigerant circulates in the order of the compressor 21, the outdoor heat exchanger 23, the liquid refrigerant connection pipe 5, the indoor heat exchangers 52a, 52b, the gas refrigerant connection pipe 6, and the compressor 21 (i.e., in the cooling operation). Specifically, the control unit 19 controls the opening degrees of the external expansion valves 71a, 71b in such a way that the degree of superheat SHr of the refrigerant at the gas-side ends of the indoor heat exchangers 52a, 52b obtained by subtracting the indoor heat exchange liquid-side temperature Trl from the indoor heat exchange gas-side temperature Trg becomes the target degree of superheat SHrt. When performing this opening degree control of the external expansion valves 71a, 71b, it is preferred that the control be able to be performed in the external expansion valve units 4a, 4b alone.

Figure 7:
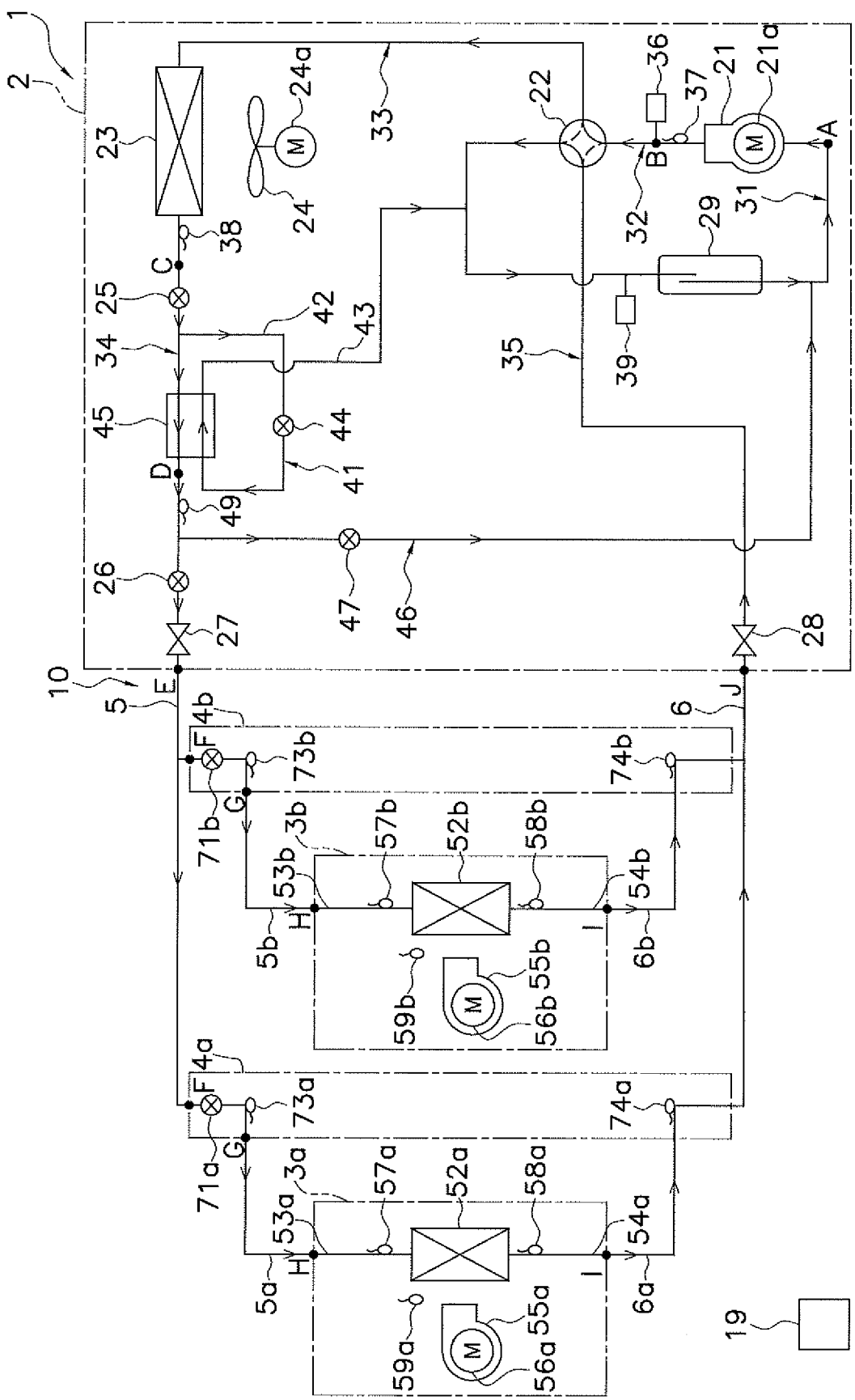
FIG. 7 is a general configuration diagram of the air conditioning apparatus pertaining to example modification 3 of the invention (showing the flow of refrigerant in the cooling operation).

Therefore, here, as shown in FIG. 7, the external expansion valve units 4a, 4b are provided not only in the liquid refrigerant connection pipe 5 (here, the branch pipe portions 5a, 5b of the liquid refrigerant connection pipe 5) but also in the gas refrigerant connection pipe 6 (specifically, the branch pipe portions 6a, 6b of the gas refrigerant connection pipe 6). Additionally, external liquid-side refrigerant temperature sensors 73a, 73b and external gas-side refrigerant temperature sensors 74a, 74b are provided in the external expansion valve units 4a, 4b, and the external liquid-side refrigerant temperature sensors 73a, 73b and the external gas-side refrigerant temperature sensors 74a, 74b can be used instead of the indoor heat exchange liquid-side sensors 57a, 57b and the indoor heat exchange gas-side sensors 58a, 58b provided in the indoor units 3a, 3b.

Because of this, here, in the cooling operation, the opening degree control of the external expansion valves 71a, 71b based on the temperatures Trl, Tlg of the refrigerant at the liquid-side ends and the gas-side ends of the indoor heat exchangers 52a, 52b can be performed in the external expansion valve units 4a, 4b alone using the external liquid-side refrigerant temperature sensors 73a, 73b and the external gas-side refrigerant temperature sensors 74a, 74b. It will be noted that, in this case, example modification 3 differs from the above embodiment and example modifications 1 and 2 in that in the cooling operation the refrigerant that has flowed out from the indoor units 3a, 3b flows through the external expansion valve units 4a, 4b (the portions provided in the branch pipe portions 6a, 6b of the gas refrigerant connection pipe 6) but is the same in other respects as the above embodiment and example modifications 1 and 2.

(6) Example Modification 4

In the air conditioning apparatus 1 of the above embodiment and example modifications 1 to 3 (see FIG. 1 to FIG. 7), the external expansion valve units 4a, 4b are provided with respect to a configuration including the indoor units 3a, 3b that do not have indoor expansion valves.

Figure 8:
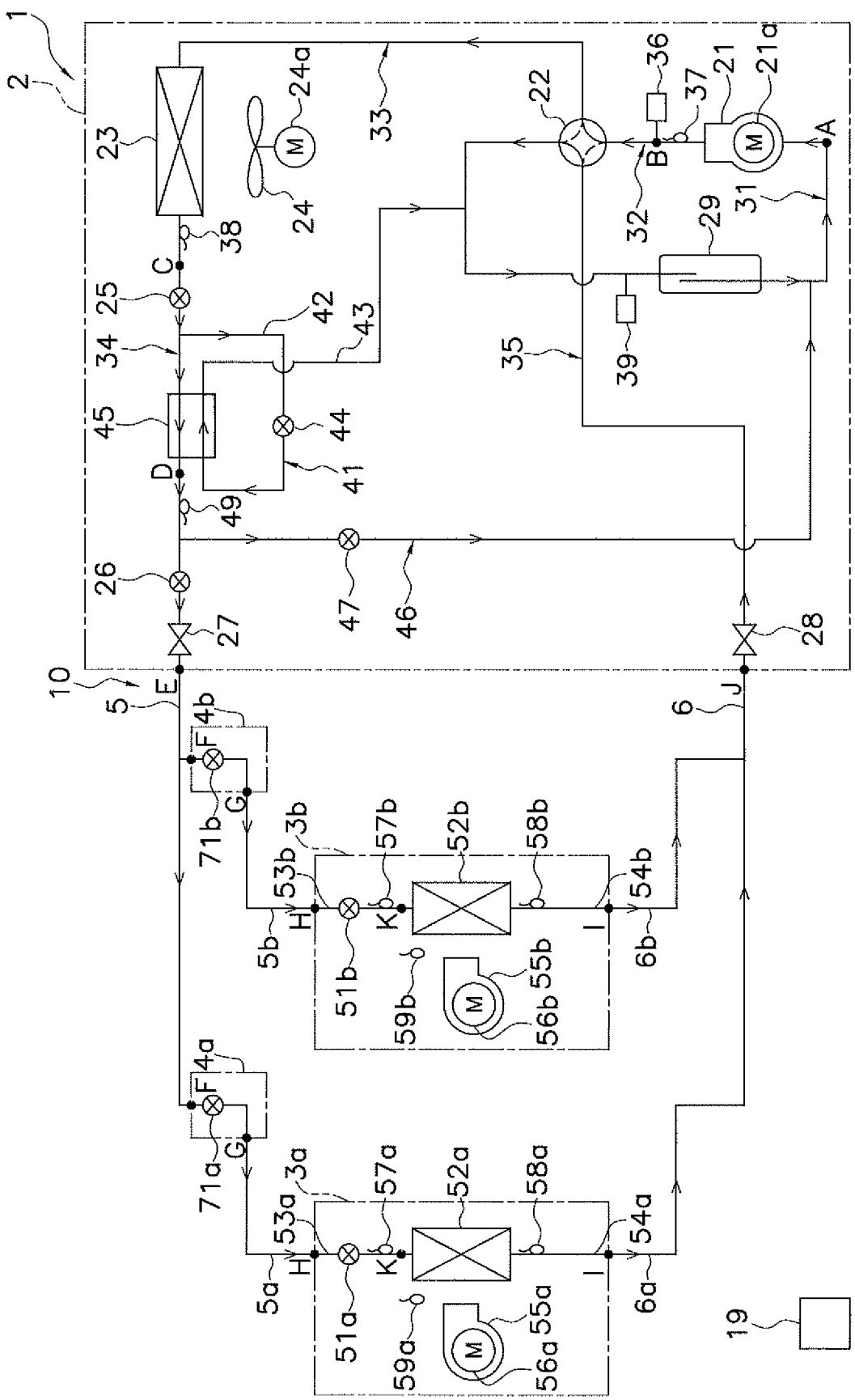
FIG. 8 is a general configuration diagram of the air conditioning apparatus pertaining to example modifications 4 and 5 of the invention (showing the flow of refrigerant in the cooling operation).

However, there are also indoor units that have indoor expansion valves. Therefore, here, as shown in FIG. 8, the external expansion valve units 4a, 4b are provided also with respect to an air conditioning apparatus 1 including indoor units 3a, 3b having indoor expansion valves 51a, 51b in the indoor liquid refrigerant pipes 53a, 53b that interconnect the liquid refrigerant connection pipe 5 and the liquid-side ends of the indoor heat exchangers 52a, 52b. For example, in a case where existing indoor units 3a, 3b have the indoor expansion valves 51a, 51b, the external expansion valve units 4a, 4b are provided by retrofitting.

In this connection, in an air conditioning apparatus including indoor units having indoor expansion valves, normally the control unit controls the opening degrees of the indoor expansion valves both when the refrigerant circulates in the order of the compressor, the outdoor heat exchanger, the liquid refrigerant connection pipe, the indoor heat exchangers, the gas refrigerant connection pipe, and the compressor (i.e., in the cooling operation) and when the refrigerant circulates in the order of the compressor, the gas refrigerant connection pipe, the indoor heat exchangers, the liquid refrigerant connection pipe, the outdoor heat exchanger, and the compressor (i.e., in the heating operation). Furthermore, when stopping the compressor, normally the control unit closes the indoor expansion valves from the state in which it is controlling the opening degrees of the indoor expansion valves.

With respect to this, here, the external expansion valve units 4a, 4b having the external expansion valves 71a, 71b are further provided, and, as described below, the control unit 19 controls the opening degrees of the external expansion valves 71a, 71b instead of the indoor expansion valves 51a, 51b in the cooling operation and the heating operation. Furthermore, also when stopping the compressor 21, the control unit 19 closes the external expansion valves 71a, 71b from the state in which it is controlling the opening degrees of the external expansion valves 71a, 71b.

Figure 9:
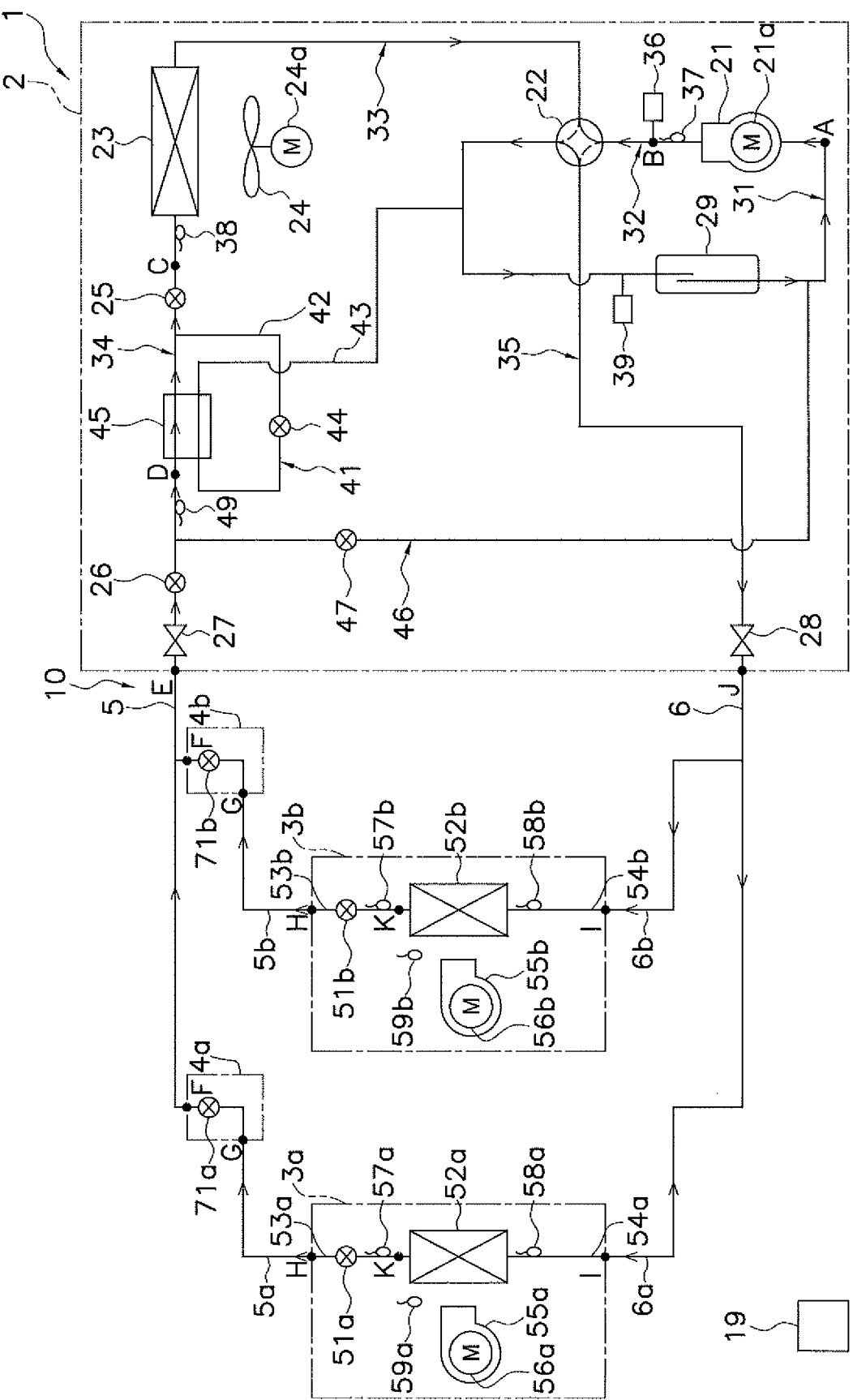
FIG. 9 is diagram showing the flow of refrigerant in the heating operation of the air conditioning apparatus pertaining to example modifications 4 and 5 of the invention.

First, in the cooling operation the control unit 19 completely opens the indoor expansion valves 51a, 51b and controls the opening degrees of the external expansion valves 71a, 71b (see FIG. 8), and in the heating operation the control unit 19 completely opens the indoor expansion valves 51a, 51b and controls the opening degrees of the external expansion valves 71a, 71b (see FIG. 9). That is, the control unit 19 fixes the indoor expansion valves 51a, 51b completely open and, as in the above embodiment and example modifications 1 to 3, is configured to perform opening degree control of the external expansion valves 71*a*, 71*b* (i.e., opening degree control based on the degree of superheat SHr or the degree of subcooling SCr). Furthermore, when stopping the compressor 21 from a state in which it is controlling the opening degrees of the external expansion valves 71*a*, 71*b*, the control unit 19 closes the external expansion valves 71*a*, 71*b* when stopping the compressor 21. That is, the control unit 19 keeps the indoor expansion valves 51*a*, 51*b* fixed completely open and closes the external expansion valves 71*a*, 71*b*.

For this reason, here, when the refrigerant circulates in the order of the compressor 21, the outdoor heat exchanger 23, the liquid refrigerant connection pipe 5, the indoor heat exchangers 52*a*, 52*b*, the gas refrigerant connection pipe 6, and the compressor 21 (i.e., in the cooling operation), the action of reducing to a low pressure the pressure of the refrigerant in the gas-liquid two-phase state whose pressure has been reduced in the liquid pressure adjusting expansion valve 26 can be performed in the external expansion valves 71*a*, 71*b* and not in the indoor expansion valves 51*a*, 51*b*.

Because of this, here, by providing the external expansion valve units 4*a*, 4*b* also with respect to the air conditioning apparatus 1 including the indoor units 3*a*, 3*b* having the indoor expansion valves 51*a*, 51*b* and reducing the pressure of the refrigerant in the gas-liquid two-phase state whose pressure has been reduced in the liquid pressure adjusting expansion valve 26, noise coming from the indoor units 3*a*, 3*b* can be reduced.

Figure 10:
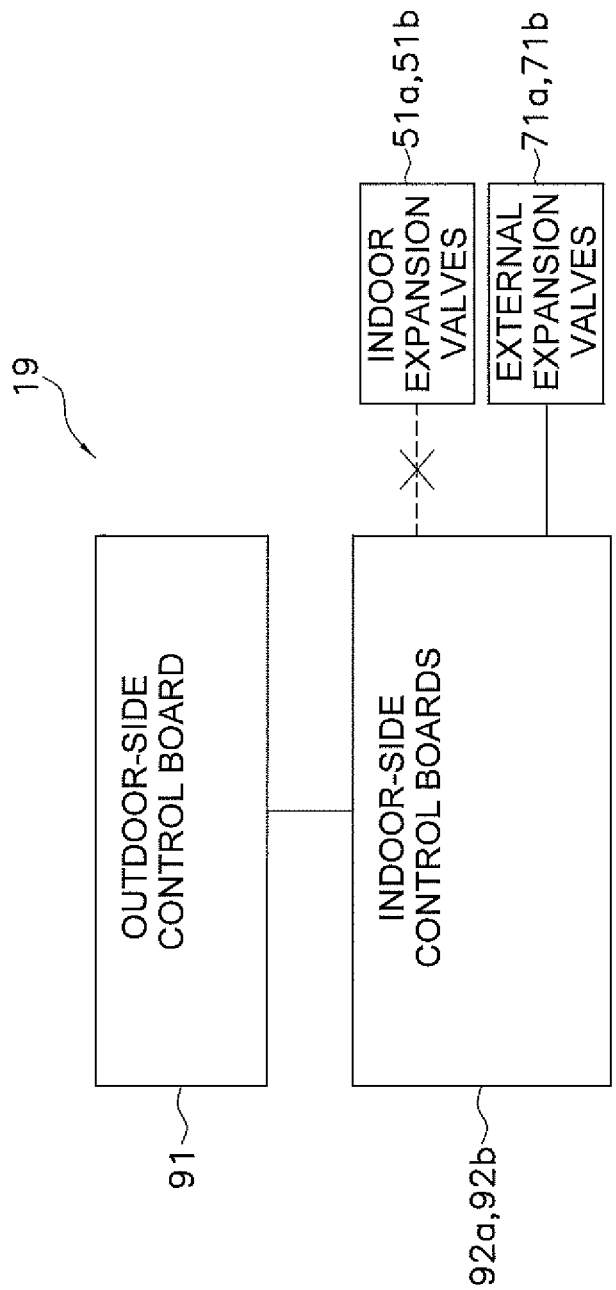
FIG. 10 is a diagram showing the configuration of a control unit of the air conditioning apparatus pertaining to example modification 4 of the invention.

Furthermore, the opening degree control including the closing of the external expansion valves 71*a*, 71*b* by the control unit 19 described above becomes possible, as shown in FIG. 10, by disconnecting the lines of the indoor expansion valves 51*a*, 51*b* that had been connected so as to receive control commands from the control unit 19 (see the communication lines indicated by the dashed line in FIG. 10) and replacing them with lines to the external expansion valves 71*a*, 71*b* (see the communication lines indicated by the solid line in FIG. 10). Here, the control unit 19 is configured as a result of an outdoor-side control board 91 that controls the actions of the constituent devices of the outdoor unit 2 and indoor-side control boards 92*a*, 92*b* that control the actions of the constituent devices of the indoor units 3*a*, 3*b* (the indoor-side control boards 92*a*, 92*b* of the indoor units 3*a*. 3*b* are shown grouped together) being communicably interconnected. It will be noted that it is best for the indoor expansion valves 51*a*, 51*b* to be fixed completely open when disconnecting the lines and replacing them with lines to the external expansion valves 71*a*, 71*b*. For this reason, the control unit 19 can perform the opening degree control described above by having the external expansion valves 71*a*, 71*b* perform as is the control commands issued to the indoor expansion valves 51*a*, 51*b*, without requiring any changes or additions for controlling the external expansion valves 71*a*, 71*b*.

In this way, here, the opening degree control that the control unit 19 had performed on the indoor expansion valves 51*a*, 51*b* can be redirected as is to easily perform the opening degree control of the external expansion valves 71*a*, 71*b*, without making any changes or additions for controlling the external expansion valves 71*a*, 71*b* to the control unit 19.

(7) Example Modification 5

In a case where the external expansion valve units 4*a*, 4*b* having the external expansion valves 71*a*, 71*b* are further provided with respect to the air conditioning apparatus 1 including the indoor units 3*a*, 3*b* having the indoor expansion valves 51*a*, 51*b* (see FIGS. 8 and 9), it is conceivable for the control unit 19 to completely open the indoor expansion valves 51*a*, 51*b* and control the opening degrees of the external expansion valves 71*a*, 71*b* not only in the cooling operation but also in the heating operation as in example modification 4. Furthermore, when stopping the compressor 21, it is conceivable for the control unit 19 to close the external expansion valves 71*a*, 71*b* while leaving completely open the indoor expansion valves 51*a*, 51*b* from a state in which it is controlling the opening degrees of the external expansion valves 71*a*, 71*b* also in the heating operation.

However, if the control unit 19 completely opens the indoor expansion valves 51*a*, 51*b* and controls the opening degrees of the external expansion valves 71*a*, 71*b* also in the heating operation, the quantity of refrigerant that accumulates in the portions of the liquid refrigerant connection pipe 5 (the branch pipe portions 5*a*, 5*b*) between the indoor units 3*a*, 3*b* and the external expansion valve units 4*a*, 4*b* ends up becoming large. That is, in the heating operation, the refrigerant radiates heat and condenses in the indoor heat exchangers 52*a*, 52*b*, so the portions of the branch pipe portions 5*a*, 5*b* of the liquid refrigerant connection pipe 5 between the indoor units 3*a*, 3*b* and the external expansion valve units 4*a*, 4*b* become filled with refrigerant in a liquid state (see points G and H in FIG. 4). Furthermore, also when stopping, the compressor 21, if the control unit 19 closes the external expansion valves 71*a*, 71*b* while leaving completely open the indoor expansion valves 51*a*, 51*b* from a state in which it is controlling the opening degrees of the external expansion valves 71*a*, 71*b*, as during the heating operation the quantity of refrigerant that accumulates in the portions of the liquid refrigerant connection pipe 5 (the branch pipe portions 5*a*, 5*b*) between the indoor units 3*a*, 3*b* and the external expansion valve units 4*a*, 4*b* ends up becoming large. In particular, if the external expansion valve units 4*a*, 4*b* are provided in positions away from the indoor units 3*a*, 3*b* (e.g., in positions 10 m or more away, as measured by the length Lp of the liquid refrigerant connection pipe 5, from the portions of the indoor units 3*a*, 3*b* connected to the liquid refrigerant connection pipe 5 as in example modification 2), the accumulated quantity of refrigerant becomes extremely large.

Therefore, here, the control unit 19 completely opens the external expansion valves 71*a*, 71*b* and controls the opening degrees of the indoor expansion valves 51*a*, 51*b* when the refrigerant circulates in the order of the compressor 21, the gas refrigerant connection pipe 6, the indoor heat exchangers 52*a*, 52*b*, the liquid refrigerant connection pipe 5, the outdoor heat exchanger 23, and the compressor 21. Furthermore, also when stopping the compressor 21 from this state, the control unit 19 closes the indoor expansion valves 51*a*, 51*b* while leaving completely open the external expansion valves 71*a*, 71*b* from the state in which it is controlling the opening degrees of the indoor expansion valves 51*a*, 51*b*.

Figure 11:
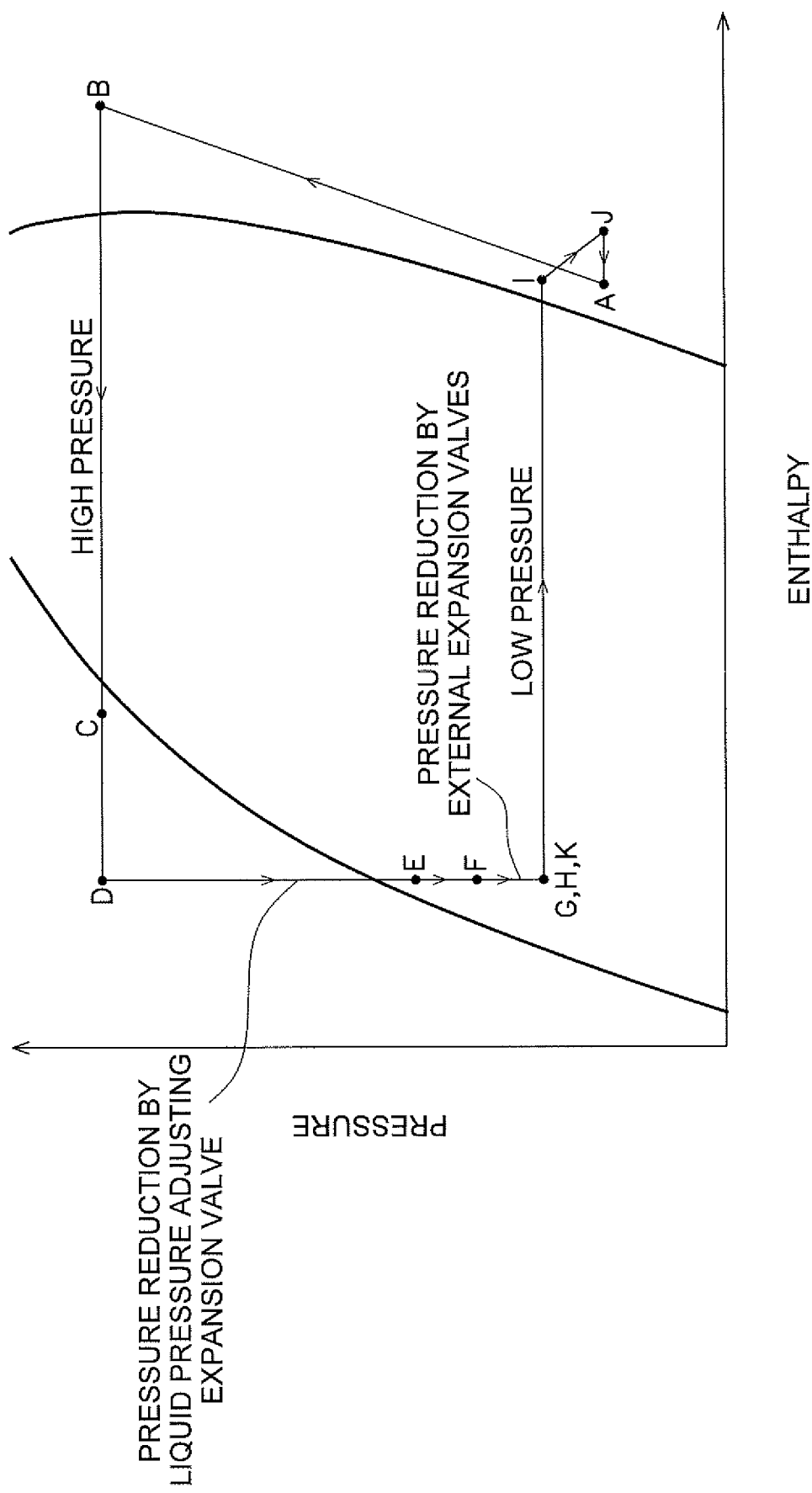
FIG. 11 is a pressure-enthalpy diagram showing a refrigeration cycle in the cooling operation in the air conditioning apparatus pertaining to example modification 5 of the invention.
Figure 12:
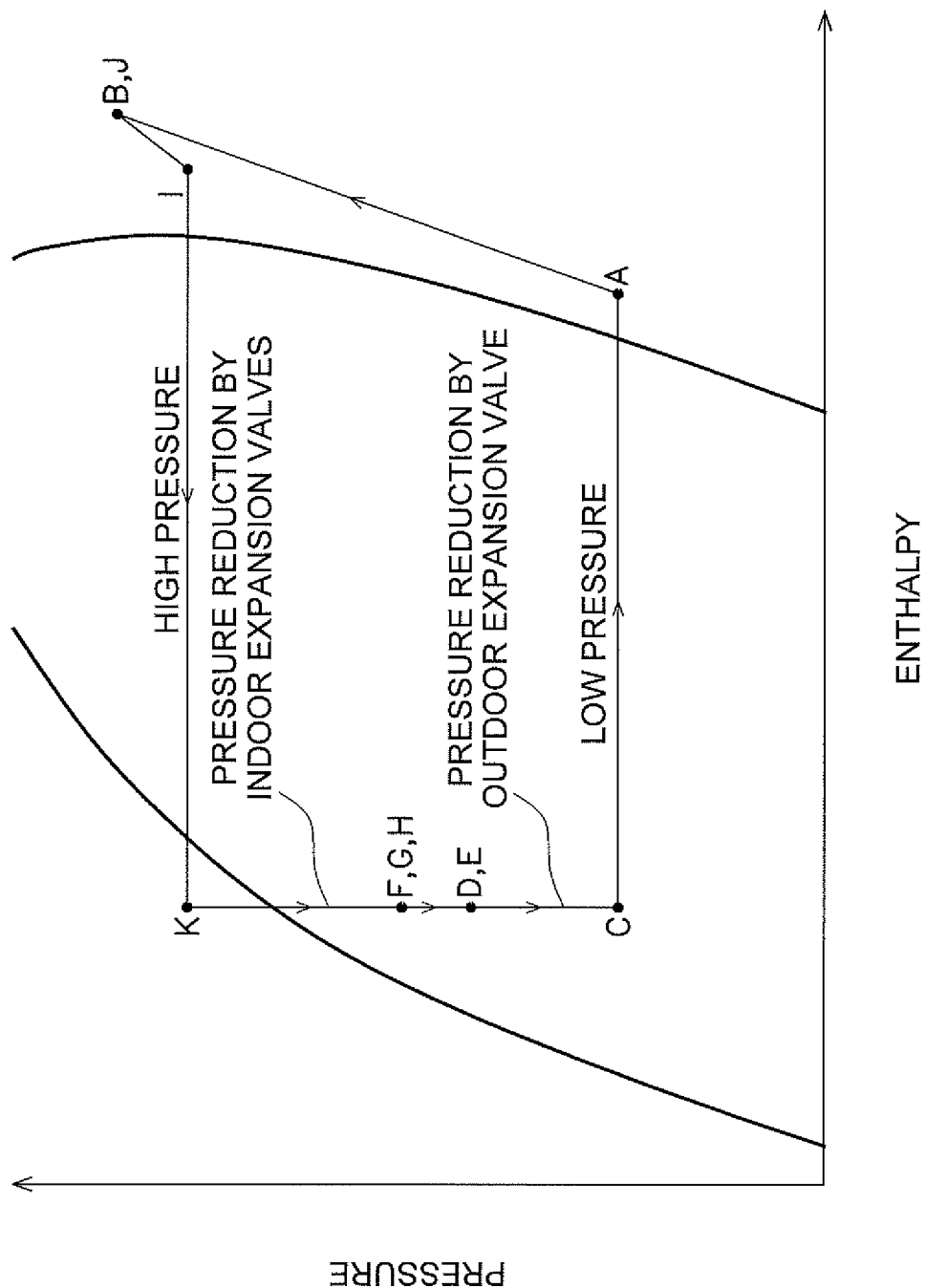
FIG. 12 is a pressure-enthalpy diagram showing a refrigeration cycle in the heating operation in the air conditioning apparatus pertaining to example modification 5 of the invention.

Specifically, in the cooling operation the control unit 19 completely opens the indoor expansion valves 51*a*, 51*b* and controls the opening degrees of the external expansion valves 71*a*, 71*b* as in the above embodiment and example modifications 1 to 4, and also when stopping the compressor 21 from this state the control unit 19 closes the external expansion valves 71*a*, 71*b* while leaving completely open the indoor expansion valves 51*a*, 51*b*. For this reason, the refrigerant flowing through the junction pipe portion of the liquid refrigerant connection pipe 5 is reduced in pressure by the external expansion valves 71a, 71b, is in to a low-pressure gas-liquid two-phase state (see points F and G in FIGS. 8 and 11), is sent through the branch pipe portions 5a, 5b of the liquid refrigerant connection pipe 5 to the indoor units 3a, 3b (see points G and H in FIGS. 8 and 11), and is sent to the indoor heat exchangers 52a, 52b without being reduced in pressure by the indoor expansion valves 51a, 51b (see points K in FIGS. 8 and 11). With respect to this, in the heating operation the control unit 19, in contrast to the above embodiment and example modifications 1 to 4, completely opens the external expansion valves 71a, 71b and controls the opening degrees of the indoor expansion valves 51a, 51b, and also when stopping the compressor 21 from this state the control unit 19 closes the indoor expansion valves 51a, 51b while leaving completely open the external expansion valves 71a, 71b. Here, the opening degree control of the indoor expansion valves 51a, 51b is control in which the control unit 19 controls the opening degrees of the indoor expansion valves 51a, 51b in such a way that the degree of subcooling SCr of the refrigerant at the liquid-side ends of the indoor heat exchangers 52a, 52b becomes the target degree of subcooling SCrt, and it is the same as in the above embodiment and example modifications 1 to 4 except that the operation targets are the indoor expansion valves 51a, 51b and not the external expansion valves 71a, 71b. For this reason, the refrigerant that has radiated heat in the indoor heat exchangers 52a, 52b is reduced in pressure by the indoor expansion valves 51a, 51b, is in a gas-liquid two-phase state (see points K and H in FIGS. 9 and 12), is sent through the branch pipe portions 5a, 5b of the liquid refrigerant connection pipe 5 to the external expansion valve units 4a, 4b (see points H and G in FIGS. 9 and 12), and is sent to the junction pipe portion of the liquid refrigerant connection pipe 5 without being reduced in pressure by the external expansion valves 71a, 71b (see points G and F in FIGS. 9 and 12).

Because of this, here, when the refrigerant circulates in the order of the compressor 21, the gas refrigerant connection pipe 6, the indoor heat exchangers 52a, 52b, the liquid refrigerant connection pipe 5, the outdoor heat exchanger 23, and the compressor 21 (in the heating operation), the refrigerant after being reduced in pressure by the indoor expansion valves 51a, 51b flows in the portions of the liquid refrigerant connection pipe 5 between the indoor units 3a, 3b and the external expansion valve units 4a, 4b (see points H and G in FIG. 12), so the accumulated quantity of refrigerant can be reduced. Furthermore, also when stopping the compressor 21, the indoor expansion valves 51a, 51b are closed, so the accumulated quantity of refrigerant in the portions of the liquid refrigerant connection pipe 5 between the indoor units 3a, 3b and the external expansion valve units 4a, 4b can be reduced.

Figure 13:
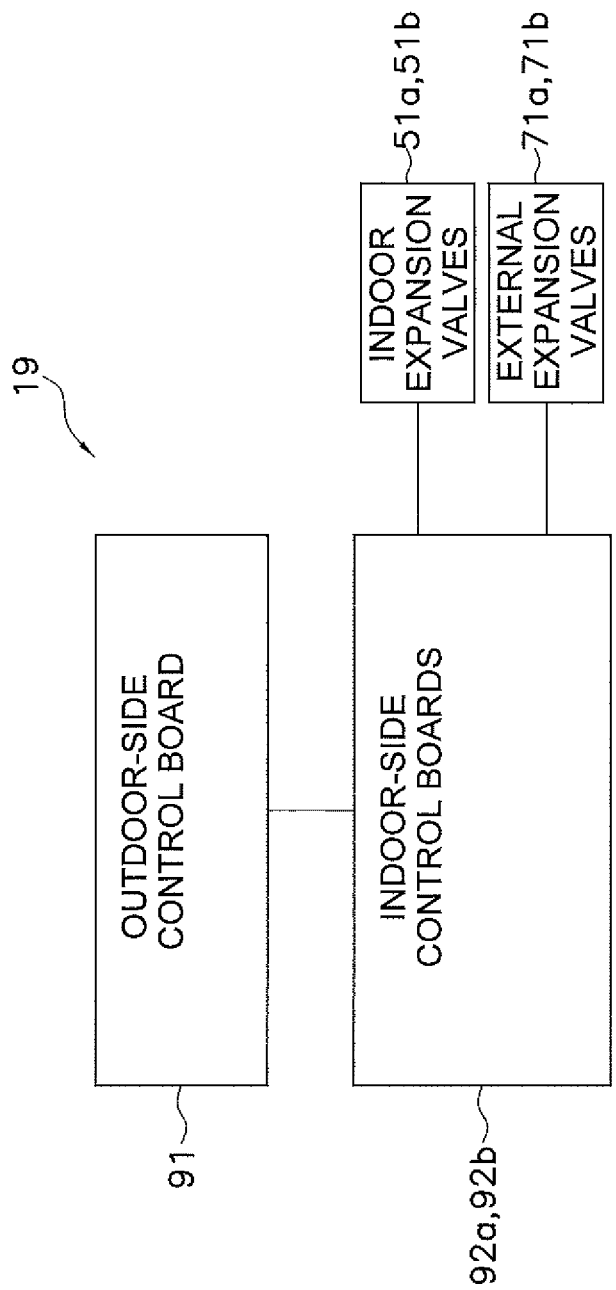
FIG. 13 is a diagram showing a configuration of the control unit of the air conditioning apparatus pertaining to example modification 5 of the invention.

Furthermore, the opening degree control including the closing of the external expansion valves 71a, 71b and the indoor expansion valves 51a, 51b by the control unit 19 described above becomes possible by additionally connecting the external expansion valves 71a, 71b to the indoor-side control boards 92a, 92b in the control unit 19 configured as a result of the outdoor-side control board 91 that controls the actions of the constituent devices of the outdoor unit 2 and the indoor-side control boards 92a, 92b that control the actions of the constituent devices of the indoor units 3a, 3b being communicably interconnected as shown in FIG. 13.

Figure 14:
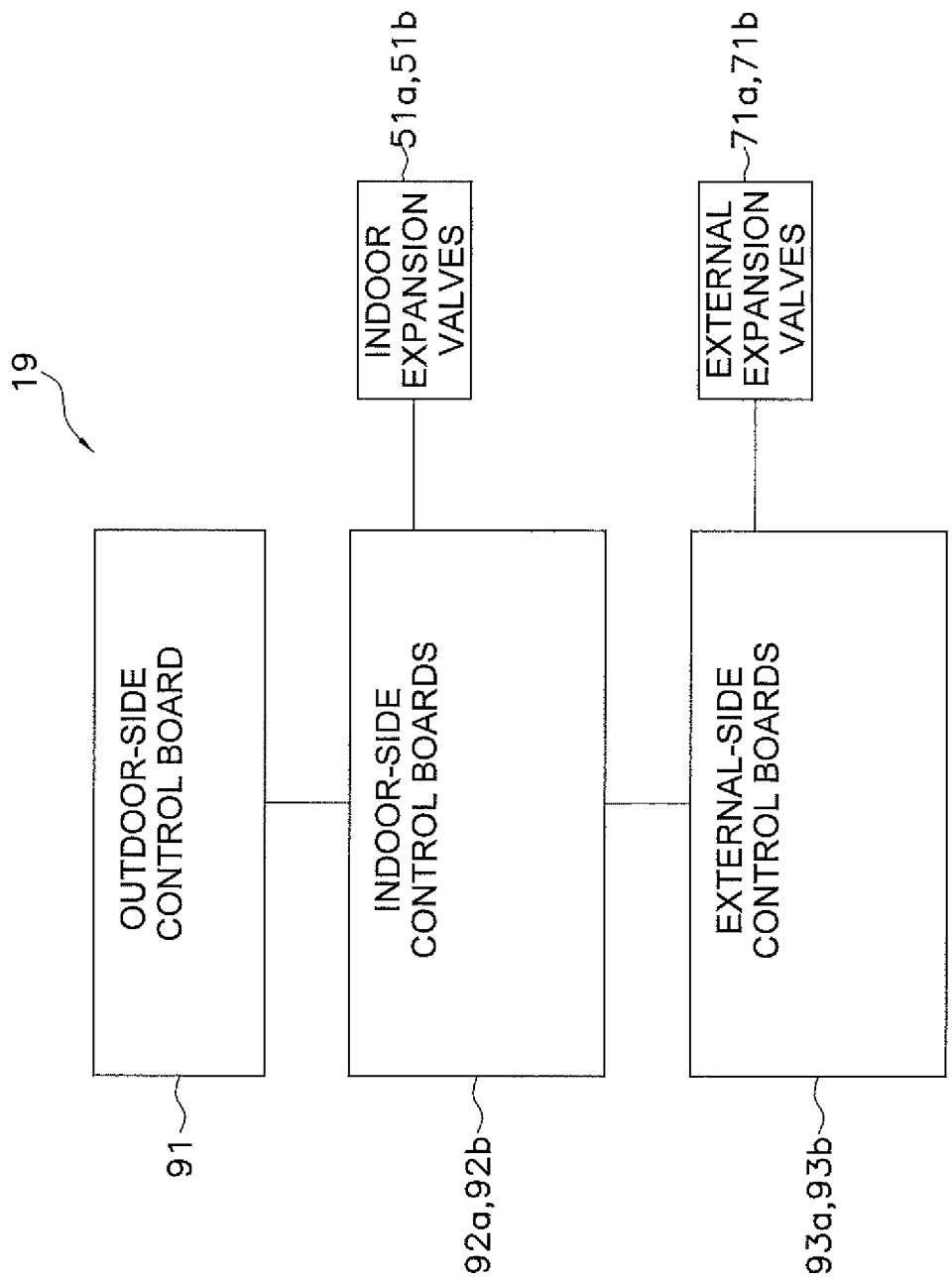
FIG. 14 is a diagram showing a configuration of the control unit of the air conditioning apparatus pertaining to example modification 5 of the invention.
Figure 15:
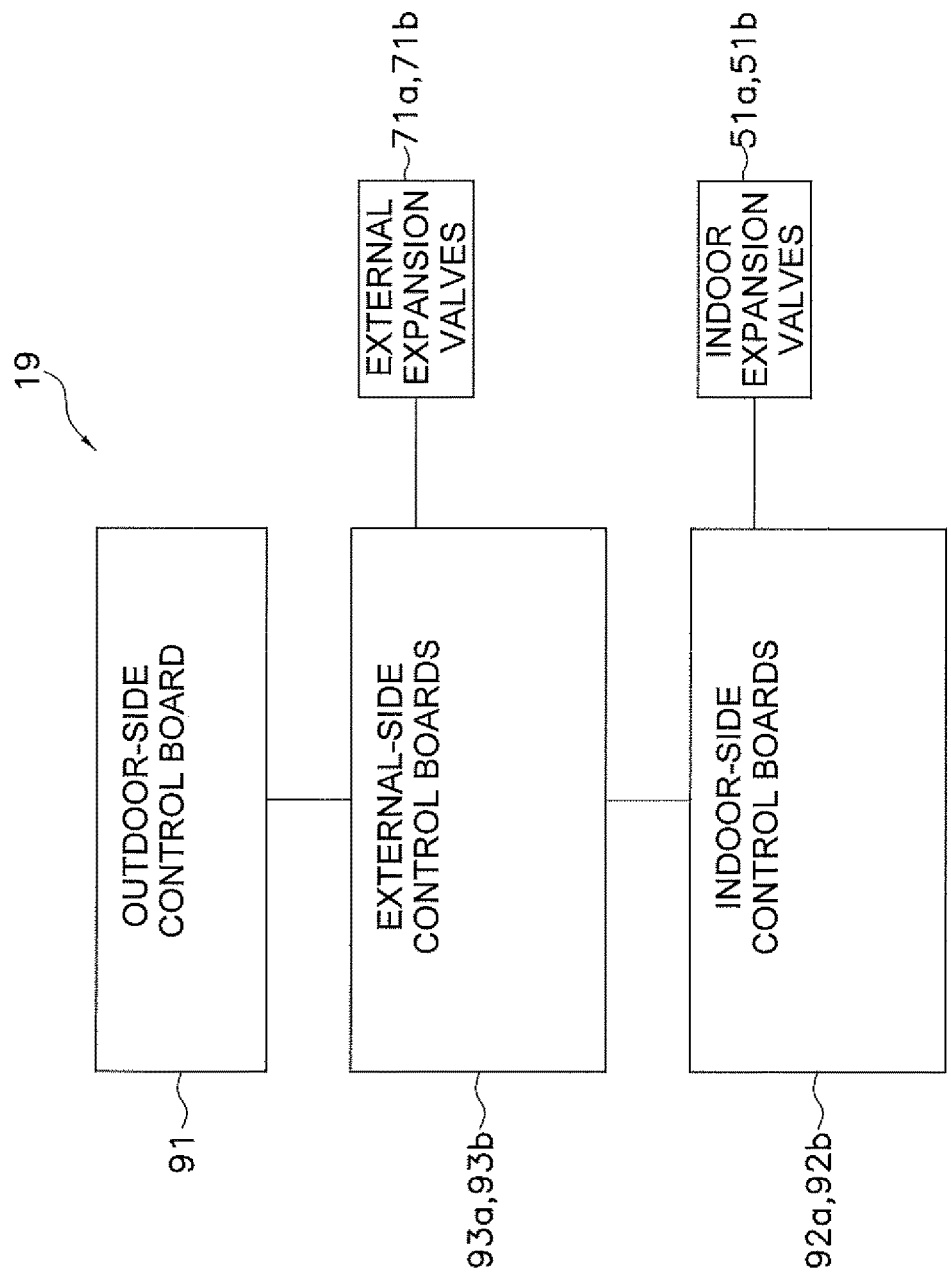
FIG. 15 is a diagram showing a configuration of the control unit of the air conditioning apparatus pertaining to example modification 5 of the invention.

Furthermore, in contrast to the control unit 19 shown in FIG. 13, the control unit 19 may also be configured by providing external-side control boards 93a, 93b that control the actions of the external expansion valves 71a, 71b in the external expansion valve units 4a, 4b and communicably connecting them to the outdoor-side control board 91 and the indoor-side control boards 92a, 92b as shown in FIG. 14 and FIG. 15. Here, in the control unit 19 shown in FIG. 14 the external-side control boards 93a, 93b are communicably connected to the indoor-side control boards 92a, 92b that are communicably connected to the outdoor-side control board 91, and in the control unit 19 shown in FIG. 15 the indoor-side control boards 92a, 92b are communicably connected to the external-side control boards 93a, 93b that are communicably connected to the outdoor-side control board 91. Here, comparing both, the control unit 19 shown in FIG. 15 is more advantageous in a case where, as in example modification 3, the external liquid-side refrigerant temperature sensors 73a, 73b and the external gas-side refrigerant temperature sensors 74a, 74b are provided in the external expansion valve units 4a, 4b and used in the opening degree control of the external expansion valves 71a, 71b in the cooling operation. This is because, with the control unit 19 shown in FIG. 15, the data of the temperatures Trl, Tlg of the refrigerant at the liquid-side ends and the gas-side ends of the indoor heat exchangers 52a, 52b that become necessary in the opening degree control of the external expansion valves 71a, 71b in the cooling operation do not need to be exchanged with the indoor-side control boards 92a, 92b, and thus opening degree control of the external expansion valves 71a, 71b becomes possible in the external expansion valve units 4a, 4b alone.

(8) Example Modification 6

Figure 16:
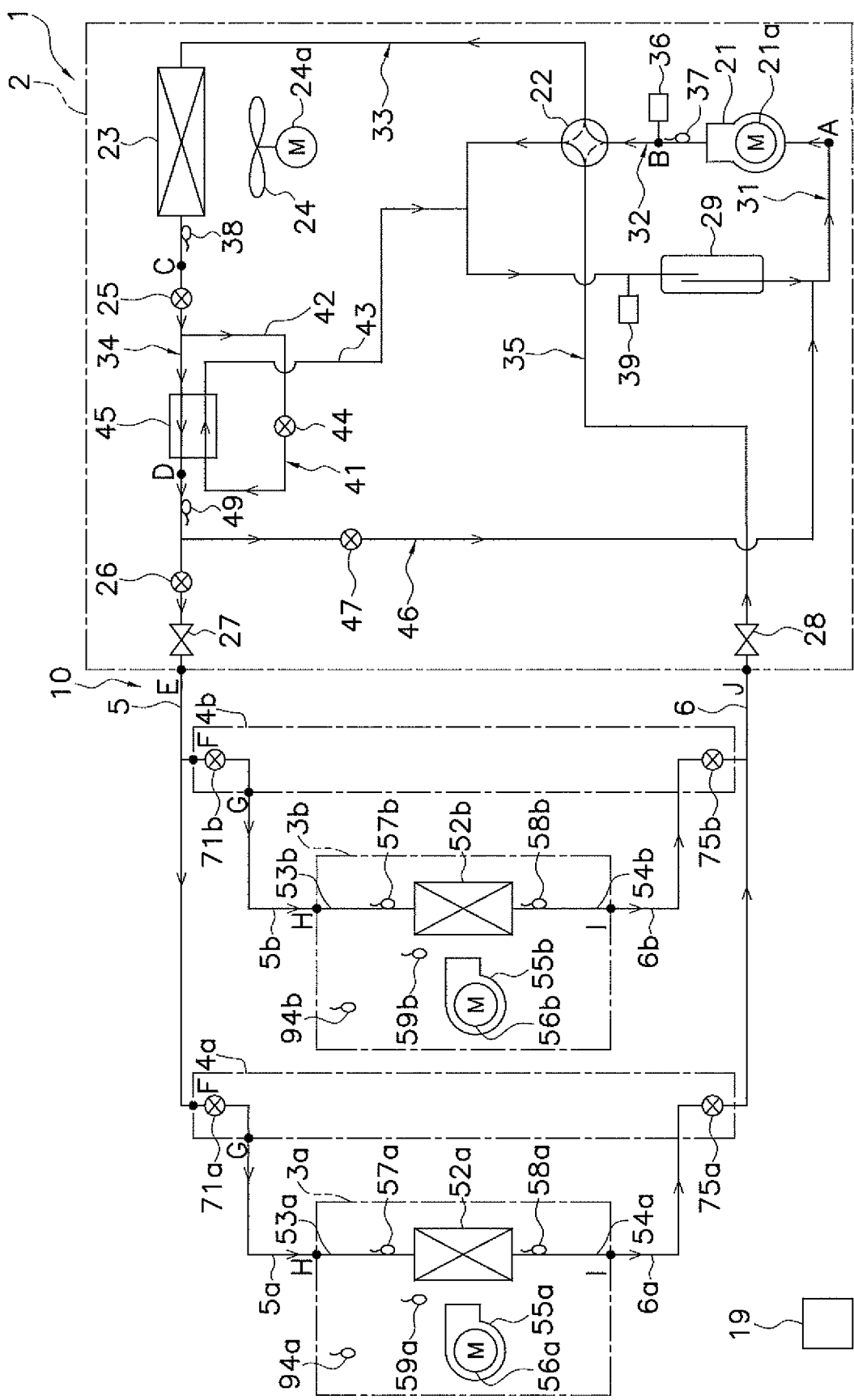
FIG. 16 is a general configuration diagram of the air conditioning apparatus pertaining to example modification 6 of the invention (showing the flow of refrigerant in the cooling operation).

In the air conditioning apparatus 1 of the above embodiment and example modifications (see FIG. 1 to FIG. 15), external shut-off valves 75a, 75b may also be provided in the external expansion valve units 4a, 4b as shown in FIG. 16. That is, the external expansion valve units 4a, 4b may be configured to be provided not only in the liquid refrigerant connection pipe 5 (here, the branch pipe portions 5a, 5b of the liquid refrigerant connection pipe 5) but also in the gas refrigerant connection pipe 6 (specifically, the branch pipe portions 6a, 6b of the gas refrigerant connection pipe 6), with the external shut-off valves 75a, 75b being further provided in them. Here, the external shut-off valves 75a, 75b may be electrically powered expansion valves or may be electromagnetic valves capable of being opened and closed.

Because of this, here, by closing the external expansion valves 71a, 71b and the external shut-off valves 75a, 75b, inflow of the refrigerant from the refrigerant connection pipes 5, 6 side to the indoor units 3a, 3b can be prevented.

Specifically, refrigerant sensors 94a, 94b serving as refrigerant leakage detecting means that detect leakage of the refrigerant are provided in the indoor units 3a, 3b, and, as shown in FIG. 17, in a case where the refrigerant leakage sensors 94a, 94b have detected leakage of the refrigerant (step ST1), the control unit 19 closes the external expansion valves 71a, 71b and the external shut-off valves 75a, 75b (step ST4). Here, the refrigerant leakage detecting means may be the refrigerant sensors 94a, 94b that directly detect refrigerant that has leaked as described above or may be means that estimate the presence/absence of leakage of the refrigerant and the quantity from, for example, the relationship between the temperature (e.g., the indoor heat exchange temperatures Trl, Trg) of the refrigerant in the indoor heat exchangers 52a, 52b and the ambient temperature (e.g., the indoor temperature Tra) around the indoor heat exchangers 52a, 52b. Furthermore, the installation positions of the refrigerant sensors 94a, 94b are not limited to the indoor units 3a, 3b and may also be in remote controllers for operating the indoor units 3a, 3b or in the air-conditioned rooms. Furthermore, when refrigerant leakage is detected in step ST1, the control unit 19 may also issue an alarm (step ST2). Furthermore, the control unit 19 may also be configured to reduce the pressure of the refrigerant from increasing too much by stopping the compressor 21 (step ST3) before closing the external expansion valves 71a, 71b and the external shut-off valves 75a, 75b.

Here, the control unit 19 is configured to close the external expansion valves 71a, 71b and the external shut-off valves 75a, 75b in a case where the refrigerant leakage detecting means have detected leakage of the refrigerant, so inflow of the refrigerant from the refrigerant connection pipes 5, 6 side to the indoor units 3a, 3b can be prevented, and the concentration of the refrigerant in the rooms can be reduced from increasing.

(9) Other Example Modifications

In the air conditioning apparatus 1 of the above embodiment and example modifications 1 to 6, when in the cooling operation the two-phase conveyance of the refrigerant, in which the refrigerant in the gas-liquid two-phase state is made to flow into the liquid refrigerant connection pipe 5 and is sent from the outdoor unit 2 side to the indoor units 3a, 3b side, is performed by the liquid pressure adjusting expansion valve 26, the action of reducing fluctuations in the liquid pipe temperature Tlp is configured to be performed by the refrigerant return pipe 41 and the refrigerant cooler 45, and the action of reducing an increase in the discharge temperature Td is configured to be performed by the liquid injection pipe 46.

However, it is alright if the action of reducing fluctuations in the liquid pipe temperature Tlp is not performed by the refrigerant return pipe 41 and the refrigerant cooler 45 and/or the action of reducing an increase in the discharge temperature Td is not performed by the liquid injection pipe 46.

INDUSTRIAL APPLICABILITY

The present invention is widely applicable to air conditioning apparatuses that have an outdoor unit that has a compressor and an outdoor heat exchanger, an indoor unit that has an indoor heat exchanger, and a liquid refrigerant connection pipe and a gas refrigerant connection pipe that interconnect both units and in which a liquid pressure adjusting expansion valve that reduces the pressure of refrigerant flowing through the liquid refrigerant connection pipe in such a way that the refrigerant is in a gas-liquid two-phase state is provided in an outdoor liquid refrigerant pipe that interconnects the liquid-side end of the outdoor heat exchanger and the liquid refrigerant connection pipe.

REFERENCE SIGNS LIST

1 Air Conditioning Apparatus
2 Outdoor Unit
3a, 3b Indoor Units
4a, 4b Expansion Valve Units
5 Liquid Refrigerant Connection Pipe
6 Gas Refrigerant Connection Pipe
19 Control Unit
21 Compressor
23 Outdoor Heat Exchanger
26 Liquid Pressure Adjusting Expansion Valve
34 Outdoor Liquid Refrigerant Pipe
51a, 51b Indoor Expansion Valves
52a, 52b Indoor Heat Exchangers
53a, 53b Indoor Liquid Refrigerant Pipes
71a, 71b External Expansion Valves
72a, 72b Sound Deadening Material
73a, 73b External Liquid-side Refrigerant Temperature Sensors
74a, 74b External Gas-side Refrigerant Temperature Sensors
75a, 75b External Shut-off Valves
94a, 94b Refrigerant Leakage Detecting Means

CITATION LIST

Patent Literature

Patent Document 1: International Publication No. 2015/029160

The invention claimed is:

1. An air conditioning apparatus comprising:
an outdoor unit that has a compressor and an outdoor heat exchanger;
an indoor unit that has an indoor heat exchanger; and
a liquid refrigerant connection pipe and a gas refrigerant connection pipe that interconnect the outdoor unit and the indoor unit,
the outdoor unit further having, in an outdoor liquid refrigerant pipe that interconnects a liquid-side end of the outdoor heat exchanger and the liquid refrigerant connection pipe, a liquid pressure adjusting expansion valve which, when a refrigerant circulates in the order of the compressor, the outdoor heat exchanger, the liquid refrigerant connection pipe, the indoor heat exchanger, the gas refrigerant connection pipe, and the compressor, reduces a pressure of the refrigerant flowing through the liquid refrigerant connection pipe in such a way that the refrigerant is in a gas-liquid two-phase state,
wherein an external expansion valve unit having an external expansion valve that further reduces the pressure of the refrigerant whose pressure has been reduced in the liquid pressure adjusting expansion valve is provided in the liquid refrigerant connection pipe,
the indoor unit further has an indoor expansion valve in an indoor liquid refrigerant pipes that interconnect the liquid refrigerant connection pipe and a liquid-side end of the indoor heat exchanger, and
a controller, that controls constituent devices of the outdoor unit, the indoor unit, and the external expansion valve unit, completely opens the indoor expansion valve and controls an opening degree of the external expansion valve when the refrigerant circulates in the order of the compressor, the outdoor heat exchanger, the liquid refrigerant connection pipe, the indoor heat exchanger, the gas refrigerant connection pipe, and the compressor and completely opens the indoor expansion valve and controls the opening degree of the external expansion valve when the refrigerant circulates in the order of the compressor, the gas refrigerant connection pipe, the indoor heat exchanger, the liquid refrigerant connection pipe, the outdoor heat exchanger, and the compressor.

2. The air conditioning apparatus according to claim 1, wherein a sound deadening material is provided on the external expansion valve unit or the external expansion valve.

3. The air conditioning apparatus according to claim 1, wherein the external expansion valve unit is provided in a position 5 m or more away, as measured by a length of the liquid refrigerant connection pipe, from a portion of the indoor unit connected to the liquid refrigerant connection pipe.

4. The air conditioning apparatus according to claim 1, wherein the external expansion valve unit is provided in a position 10 m or more away, as measured by a length of the liquid refrigerant connection pipe, from a portion of the indoor unit connected to the liquid refrigerant connection pipe.

5. The air conditioning apparatus according to claim 1, wherein the external expansion valve unit further has an external liquid-side refrigerant temperature sensor and an external gas-side refrigerant temperature sensor that detect temperatures of the refrigerant at a liquid-side end and a gas-side end of the indoor heat exchanger.

6. The air conditioning apparatus according to claim 1, wherein the external expansion valve unit further has an external shut-off valve provided in the gas refrigerant connection pipe.

7. The air conditioning apparatus according to claim 6, further comprising a refrigerant leakage detector that detects leakage of the refrigerant,
wherein the controller that controls constituent devices of the outdoor unit, the indoor unit, and the external expansion valve unit closes the external expansion valve and the external shut-off valve in a case where the refrigerant leakage detector has detected leakage of the refrigerant.

8. The air conditioning apparatus according to claim 1, wherein the controller closes the external expansion valve while leaving completely open the indoor expansion valve when stopping the compressor from a state in which the controller has completely opened the indoor expansion valve and is controlling the opening degree of the external expansion valve.

9. An air conditioning apparatus comprising:
an outdoor unit that has a compressor and an outdoor heat exchanger;
an indoor unit that has an indoor heat exchanger; and
a liquid refrigerant connection pipe and a gas refrigerant connection pipe that interconnect the outdoor unit and the indoor unit,
the outdoor unit further having, in an outdoor liquid refrigerant pipe that interconnects a liquid-side end of the outdoor heat exchanger and the liquid refrigerant connection pipe, a liquid pressure adjusting expansion valve which, when a refrigerant circulates in the order of the compressor, the outdoor heat exchanger, the liquid refrigerant connection pipe, the indoor heat exchanger, the gas refrigerant connection pipe, and the compressor, reduces a pressure of the refrigerant flowing through the liquid refrigerant connection pipe in such a way that the refrigerant is in a gas-liquid two-phase state,
wherein an external expansion valve unit having an external expansion valve that further reduces the pressure of the refrigerant whose pressure has been reduced in the liquid pressure adjusting expansion valve is provided in the liquid refrigerant connection pipe,
the indoor unit further has an indoor expansion valve in an indoor liquid refrigerant pipes that interconnect the liquid refrigerant connection pipe and a liquid-side end of the indoor heat exchanger, and
a controller, that controls constituent devices of the outdoor unit, the indoor unit, and the external expansion valve unit, completely opens the indoor expansion valve and controls an opening degree of the external expansion valve when the refrigerant circulates in the order of the compressor, the outdoor heat exchanger, the liquid refrigerant connection pipe, the indoor heat exchanger, the gas refrigerant connection pipe, and the compressor and completely opens the external expansion valve and controls an opening degree of the indoor expansion valve when the refrigerant circulates in the order of the compressor, the gas refrigerant connection pipe, the indoor heat exchanger, the liquid refrigerant connection pipe, the outdoor heat exchanger, and the compressor.

10. An air conditioning apparatus comprising:
an outdoor unit that has a compressor and an outdoor heat exchanger;
an indoor unit that has an indoor heat exchanger; and
a liquid refrigerant connection pipe and a gas refrigerant connection pipe that interconnect the outdoor unit and the indoor unit,
the outdoor unit further having, in an outdoor liquid refrigerant pipe that interconnects a liquid-side end of the outdoor heat exchanger and the liquid refrigerant connection pipe, a liquid pressure adjusting expansion valve which, when a refrigerant circulates in the order of the compressor, the outdoor heat exchanger, the liquid refrigerant connection pipe, the indoor heat exchanger, the gas refrigerant connection pipe, and the compressor, reduces a pressure of the refrigerant flowing through the liquid refrigerant connection pipe in such a way that the refrigerant is in a gas-liquid two-phase state,
wherein an external expansion valve unit having an external expansion valve that further reduces the pressure of the refrigerant whose pressure has been reduced in the liquid pressure adjusting expansion valve is provided in the liquid refrigerant connection pipe,
the indoor unit further has an indoor expansion valve in an indoor liquid refrigerant pipes that interconnect the liquid refrigerant connection pipe and a liquid-side end of the indoor heat exchanger, and
a controller, that controls constituent devices of the outdoor unit, the indoor unit, and the external expansion valve unit, controls an opening degree of the external expansion valve both when the refrigerant circulates in the order of the compressor, the outdoor heat exchanger, the liquid refrigerant connection pipe, the indoor heat exchanger, the gas refrigerant connection pipe, and the compressor and when the refrigerant circulates in the order of the compressor, the gas refrigerant connection pipe, the indoor heat exchanger, the liquid refrigerant connection pipe, the outdoor heat exchanger, and the compressor.

11. The air conditioning apparatus according to claim 9, wherein the controller, when stopping the compressor from a state in which the controller has completely opened the indoor expansion valve and is controlling the opening degree of the external expansion valve, closes the external expansion valve while leaving completely open the indoor expansion valve, and, when stopping the compressor from a state in which the controller has completely opened the external expansion valve and is controlling the opening degree of the indoor expansion valve, closes the indoor expansion valve while leaving completely open the external expansion valve.

12. An air conditioning apparatus comprising:
an outdoor unit that has a compressor and an outdoor heat exchanger;
an indoor unit that has an indoor heat exchanger; and
a liquid refrigerant connection pipe and a gas refrigerant connection pipe that interconnect the outdoor unit and the indoor unit,
the outdoor unit further having, in an outdoor liquid refrigerant pipe that interconnects a liquid-side end of the outdoor heat exchanger and the liquid refrigerant connection pipe, a liquid pressure adjusting expansion valve which, when a refrigerant circulates in the order of the compressor, the outdoor heat exchanger, the liquid refrigerant connection pipe, the indoor heat exchanger, the gas refrigerant connection pipe, and the compressor, reduces a pressure of the refrigerant flowing through the liquid refrigerant connection pipe in such a way that the refrigerant is in a gas-liquid two-phase state,
wherein an external expansion valve unit having an external expansion valve that further reduces the pressure of the refrigerant whose pressure has been reduced in the liquid pressure adjusting expansion valve is provided in the liquid refrigerant connection pipe,
the indoor unit further has an indoor expansion valve in an indoor liquid refrigerant pipes that interconnect the liquid refrigerant connection pipe and a liquid-side end of the indoor heat exchanger, and
a controller, that controls constituent devices of the outdoor unit, the indoor unit, and the external expansion valve unit, controls an opening degree of the external expansion valve to allow the refrigerant after being reduced in a pressure by the external expansion valve to flow in a portion of the liquid refrigerant connection pipe between the indoor unit and the external expansion valve unit when the refrigerant circulates in the order of the compressor, the outdoor heat exchanger, the liquid refrigerant connection pipe, the indoor heat exchanger, the gas refrigerant connection pipe, and the compressor and controls an opening degree of the indoor expansion valve to allow the refrigerant after being reduced in a pressure by the indoor expansion valve to flow in a portion of the liquid refrigerant connection pipe between the indoor unit and the external expansion valve unit when the refrigerant circulates in the order of the compressor, the gas refrigerant connection pipe, the indoor heat exchanger, the liquid refrigerant connection pipe, the outdoor heat exchanger, and the compressor.

13. The air conditioning apparatus according to claim 2, wherein the external expansion valve unit further has an external liquid-side refrigerant temperature sensor and an external gas-side refrigerant temperature sensor that detect temperatures of the refrigerant at a liquid-side end and a gas-side end of the indoor heat exchanger.

14. The air conditioning apparatus according to claim 3, wherein the external expansion valve unit further has an external liquid-side refrigerant temperature sensor and an external gas-side refrigerant temperature sensor that detect temperatures of the refrigerant at a liquid-side end and a gas-side end of the indoor heat exchanger.

15. The air conditioning apparatus according to claim 4, wherein the external expansion valve unit further has an external liquid-side refrigerant temperature sensor and an external gas-side refrigerant temperature sensor that detect temperatures of the refrigerant at a liquid-side end and a gas-side end of the indoor heat exchanger.

16. The air conditioning apparatus according to claim 2, wherein the external expansion valve unit further has an external shut-off valve provided in the gas refrigerant connection pipe.

17. The air conditioning apparatus according to claim 3, wherein the external expansion valve unit further has an external shut-off valve provided in the gas refrigerant connection pipe.

18. The air conditioning apparatus according to claim 4, wherein the external expansion valve unit further has an external shut-off valve provided in the gas refrigerant connection pipe.

19. The air conditioning apparatus according to claim 5, wherein the external expansion valve unit further has an external shut-off valve provided in the gas refrigerant connection pipe.

* * * * *